(12) United States Patent
Jang et al.

(10) Patent No.: US 12,475,667 B2
(45) Date of Patent: Nov. 18, 2025

(54) METHOD, DEVICE, AND SYSTEM FOR OUTPUTTING DESCRIPTION OF PATENT REFERENCE SIGN

(71) Applicant: WERT INTELLIGENCE CO., LTD., Seoul (KR)

(72) Inventors: Young Jin Jang, Seoul (KR); Jung Ho Yun, Seoul (KR); Kyu Hak Park, Seoul (KR)

(73) Assignee: WERT INTELLIGENCE CO., LTD, Seoul (KR)

( * ) Notice: Subject to any disclaimer, the term of this patent is extended or adjusted under 35 U.S.C. 154(b) by 291 days.

(21) Appl. No.: 17/918,670

(22) PCT Filed: Apr. 14, 2021

(86) PCT No.: PCT/KR2021/004706
§ 371 (c)(1),
(2) Date: Oct. 13, 2022

(87) PCT Pub. No.: WO2021/210912
PCT Pub. Date: Oct. 21, 2021

(65) Prior Publication Data
US 2023/0351791 A1    Nov. 2, 2023

(30) Foreign Application Priority Data

Apr. 14, 2020 (KR) .................. 10-2020-0045051
Apr. 14, 2020 (KR) .................. 10-2020-0045054

(51) Int. Cl.
*G06V 10/00* (2022.01)
*G06F 16/583* (2019.01)
(Continued)

(52) U.S. Cl.
CPC .......... *G06V 10/10* (2022.01); *G06F 16/5846* (2019.01); *G06V 10/82* (2022.01);
(Continued)

(58) Field of Classification Search
CPC ........ G06V 10/10; G06V 10/82; G06V 30/15; G06V 30/19013; G06V 30/19147;
(Continued)

(56) References Cited

U.S. PATENT DOCUMENTS

| | | | |
|---|---|---|---|
| 2011/0167081 A1* | 7/2011 | Kosaka ................ | G06V 30/413 707/769 |
| 2015/0309969 A1 | 10/2015 | Kahn | |
| 2019/0072977 A1* | 3/2019 | Jeon ..................... | G06V 10/454 |

FOREIGN PATENT DOCUMENTS

| | | |
|---|---|---|
| KR | 10-2016-0125931 A | 11/2016 |
| KR | 10-2018-0106517 A | 1/2018 |

(Continued)

OTHER PUBLICATIONS

International Search Report for PCT/KR2021/004706, dated Jul. 6, 2021.

*Primary Examiner* — Xiao Liu
(74) *Attorney, Agent, or Firm* — Sughrue Mion, PLLC

(57) ABSTRACT

A method for outputting a drawing reference number description including recognizing a size of a patent drawing and a position of a drawing reference number included in the patent drawing and acquiring a relative position coordinate of the drawing reference number in the patent drawing; setting a relative position coordinate of the drawing reference number description corresponding to the drawing reference number based on the acquired relative position coordinate; and outputting the drawing reference number description on the set relative position coordinate, thereby outputting such that the drawing reference number description corresponds to the drawing reference number.

15 Claims, 16 Drawing Sheets

(51) Int. Cl.
  *G06V 10/10*    (2022.01)
  *G06V 10/82*    (2022.01)
  *G06V 30/148*   (2022.01)
  *G06V 30/19*    (2022.01)
  *G06V 30/30*    (2022.01)
  *G06V 30/422*   (2022.01)

(52) U.S. Cl.
  CPC ........ *G06V 30/15* (2022.01); *G06V 30/19013* (2022.01); *G06V 30/19147* (2022.01); *G06V 30/19173* (2022.01); *G06V 30/30* (2022.01); *G06V 30/422* (2022.01); *G06F 2216/11* (2013.01)

(58) Field of Classification Search
  CPC ............. G06V 30/19173; G06V 30/30; G06V 30/422; G06V 10/24; G06V 30/10; G06F 16/5846; G06F 2216/11; G06F 9/451; G06F 40/103; G06F 40/166; G06F 3/04845; G06F 3/0485; G06F 16/54; Y10S 707/937
  See application file for complete search history.

(56) References Cited

FOREIGN PATENT DOCUMENTS

| KR | 10-2020-0013130 A |   | 2/2020 |               |
|----|-------------------|---|--------|---------------|
| KR | 20200013130 A     | * | 2/2020 | ... G06V 30/153 |
| KR | 10-2020-0038006 A |   | 4/2020 |               |

* cited by examiner

METHOD, DEVICE, AND SYSTEM FOR OUTPUTTING DESCRIPTION OF PATENT REFERENCE SIGN

CROSS REFERENCE TO RELATED APPLICATIONS

This application is a National Stage of International Application No. PCT/KR2021/004706 filed Apr. 14, 2021, claiming priority based on Korean Patent Application No. 10-2020-0045054 filed Apr. 14, 2020 and Korean Patent Application No. 10-2020-0045051 filed Apr. 14, 2020, the entire disclosures of which are incorporated herein by reference.

FIELD

The present disclosure relates to a patent drawing reference number description output method, device and system therefor.

BACKGROUND

Knowledge information contents such as theses and patent documents generally consist of a large number of pages. Such contents include drawings, equations and texts that describe them, and particularly, due to formatting limitations, drawings and related texts are often placed on different pages. Accordingly, a reader of those contents has to read the contents multiple times by going back and forth the pages in order to understand the descriptions about the drawings or equations, and therefore a problem occurs where it takes too much time and effort to acquire knowledge information.

Recently, in order to solve this problem, a method is becoming available in which Optical Character Recognition (OCR) technology is used to precisely recognize characters and/or numbers on knowledge information contents, thereby improving the speed in accessing necessary information within the contents. However, this method also provides only a simple character-based search function, so it is difficult to quickly acquire information related to drawings.

Nevertheless, a solution that can rapidly acquire knowledge information by extracting information of linkage between drawings and contents by utilizing format structure information of the contents thereby providing a drawing-oriented content analysis method has not been provided so far.

SUMMARY

Thus, a technical problem to be solved by the present disclosure is to provide a solution for efficiently analyzing knowledge information contents, centering on drawing information.

Specifically, the technical problem to be solved by the present disclosure is to provide a method and apparatus for identifying characters (particularly, drawing reference number description) interlocked to the drawing reference number, through optical character reading and/or machine learning regarding the drawing reference number.

And/or, another technical problem to be solved by the present disclosure is to provide a method for not only searching characters (particularly, drawing reference number description) based on the drawing reference number, but also for searching the drawings based on the characters.

Specifically, the other technical problem to be solved by the present disclosure is to provide a drawing-based contents analysis method that can filter all drawings where a drawing reference number is included based on characters interlocked to the drawing reference number (particularly, drawing reference number description).

And/or, another technical problem to be solved by the present disclosure is to position a matching drawing reference number description on an area of the drawing where the drawing reference number is displayed, thereby providing users with intuitive information related to the drawing.

Specifically, the other technical problem to be solved by the present disclosure is to provide a solution that positions/moves a drawing reference number description to an appropriate area adapting to a state change of the drawing.

The technical problems of the present disclosure are not limited to the technical problems mentioned above, and other technical problems not mentioned above will be clearly understood by those skilled in the art from the following description.

A patent drawing reference number recognition method according to an embodiment of the present disclosure may include learning a plurality of patent drawing samples, and building a drawing reference number position recognition model and a drawing reference number recognition model; receiving input of a patent drawing that is subject of a drawing reference number recognition; recognizing a position of a drawing reference number included in the patent drawing using the drawing reference number position recognition model; cutting out the drawing reference number of the recognized position from the patent drawing in an image piece; and recognizing the drawing reference number included in the image piece using the drawing reference number recognition model.

According to an embodiment of the present disclosure, by displaying a drawing reference number description in replacement of the reference number displayed on the drawing, there is an advantage that a user can acquire information of an invention more easily and intuitively through the drawing. Especially, all related drawings can be filtered based on the drawing reference number description thus enabling drawing-centered analysis of knowledge information contents through intensive analysis of the filtered drawings.

In addition, according to another embodiment of the present disclosure, based on a drawing reference number description, it is possible to visually identify not only the drawing that includes the corresponding drawing reference number description, but also a sentence and paragraph. Therefore, on a large amount of texts, the user becomes able to quickly access the desired information having the drawing reference number description as a medium.

Further, according to another embodiment of the present disclosure, even in a state change such as drawing enlargement, reduction, movement, and enlargement, etc., by positioning a drawing reference number description in an area of high readability within the state-changed drawing, convenience of analyzing knowledge information contents through the drawing in various analyzing environments can be provided.

The effects of the present disclosure are not limited to the effects mentioned above, and other effects not mentioned above will be clearly understood by those skilled in the art from the following description.

DETAILED DESCRIPTION

Figure 1:
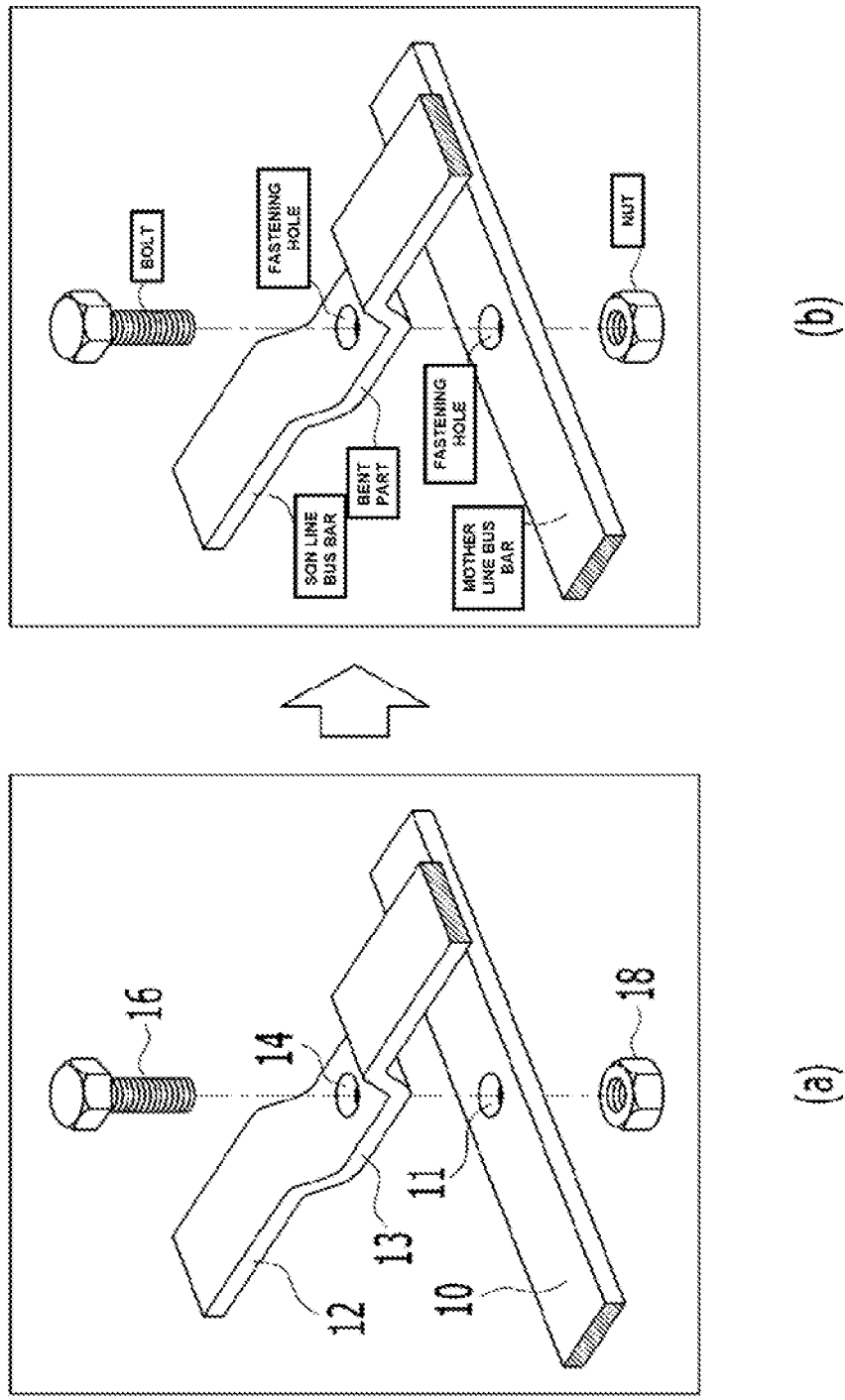
FIG. 1 is a view exemplifying an embodiment of providing a patent drawing according to an embodiment of the present disclosure.

The technology to be described below may have various changes and may have various embodiments, and specific embodiments will be exemplified in the drawings and described in detail. However, it should be understood that this is not intended to limit the technology described below to specific embodiment forms, but to include all changes, equivalents or substitutes included in the spirit and scope of the technology described below.

Terms such as first, second, A, B and etc. may be used to describe various components, but the components are not limited by the above terms, and are used only for the purpose of distinguishing one component from another. For example, without departing from the scope of the present disclosure, a first component may be named as a second component, and similarly, a second component may also be named as a first component. The term, and/or, includes a combination of a plurality of related listed items or any one of the plurality of related listed items. For example, 'A and/or B' may be interpreted as meaning 'at least one of A or B'. Further, '/' may be interpreted as 'and' or 'or'.

A singular expression in the terms used in the present specification should be understood to include a plural expression unless the context clearly dictates otherwise, and it should be understood that the term "includes/comprises" means an implemented feature, number, step, action, component, part, or combination thereof exists, but does not exclude the possibility of the presence or addition of one or more other features, numbers, steps, actions, components, or parts or a combinations thereof.

Prior to a detailed description of the drawings, it is intended to clarify that the classification of the components in the present specification is merely a division for each main function that each component is responsible for. That is, two or more components to be described below may be combined to one, or one component may be divided into two or more for each more subdivided function. In addition, each of the components to be described below may additionally perform some or all of the functions of other components in addition to the main function it is responsible for, and some of the main functions of each component may of course be exclusively performed by other components as well.

Further, in performing a method or operation method, each of the processes constituting the method may occur in a different order from the specified order unless a specific order is clearly stated in context. That is, each of the processes may occur in the same order as specified, may be performed substantially simultaneously, or may be performed in the reverse order.

FIG. 1 is a view exemplifying an embodiment of providing a patent drawing according to an embodiment of the present disclosure.

In more detail, (a) of FIG. 1 is an embodiment of providing a general patent drawing, and (b) of FIG. 1 is an embodiment of providing a patent drawing where drawing reference numbers have been replaced by drawing reference number descriptions according to an embodiment of the present disclosure.

Knowledge information contents such as theses or patent literature often use a lot of drawings as a means to more easily and intuitively describe information to users. A user can grasp the contents of the knowledge information contents more easily and efficiently by grasping the drawing and the description of the drawing at the same time. However, knowledge information contents usually consist of a large number of pages, and thus in order for a user to grasp the drawing and the description of the drawing at the same time, the user had to read the pages multiple times alternately. This acted as a very big obstacle for the user to grasp the knowledge information contents easily and efficiently.

Especially, of knowledge information contents, in the case of a patent literature drawing, it is common to be described with drawing reference number for each component as shown in (a) of FIG. 1, and such drawing reference numbers are granted by an inventor arbitrarily for the convenience of describing the drawing, and thus are characterized to lack regularity and are very different for each patent literature. Therefore, in order for a user to grasp the contents of the drawings (especially, each drawing reference number description), it is very important to grasp the drawings and the description of the drawings at the same time. However, this has a problem that it not only causes inconvenience to the user but also increases time and expense.

Thus, the present specification proposes a technology of providing a patent drawing in which each drawing reference number is directly replaced with a drawing reference number description corresponding to each drawing reference number as shown in (b) of FIG. 1 so that the user can more easily and efficiently grasp the invention.

This technology of providing a patent drawing can be broadly divided into three technologies as follows.

1. Drawing reference number recognition technology
2. Drawing reference number description extraction technology
3. Technology of replacing recognized drawing reference number with extracted drawing reference number description Depending on the embodiment, technologies of 1 to 3 described above may be integrated into one technology and performed sequentially, or may be independently performed/borrowed as individual technologies. Technologies of 1 to 3 will be described in detail with reference to each drawing hereinafter.

Technology of providing a patent drawing proposed in the present specification will be described based on cases of application to a website servicing patent literature search. The patent drawing providing technology proposed in the present specification will be described based on the case of being applied to a web site that provides a patent literature search service. Therefore, the embodiments described below may be interpreted as being performed by a web server that manages/operates a patent literature search web site. However, there is no limitation thereto, and embodiments of the present specification may also be applied to programs and applications that provide patent literature search services, in which case a web site may be described as being replaced by a programs or application, and a web server may be described as being replaced by a program server or application server.

Meanwhile, in describing the present disclosure, patent literatures are exemplified as knowledge information contents, but the present disclosure is not limited thereto, and may of course be extended and applied to various knowledge information contents such as theses and books, etc.

Figure 2:
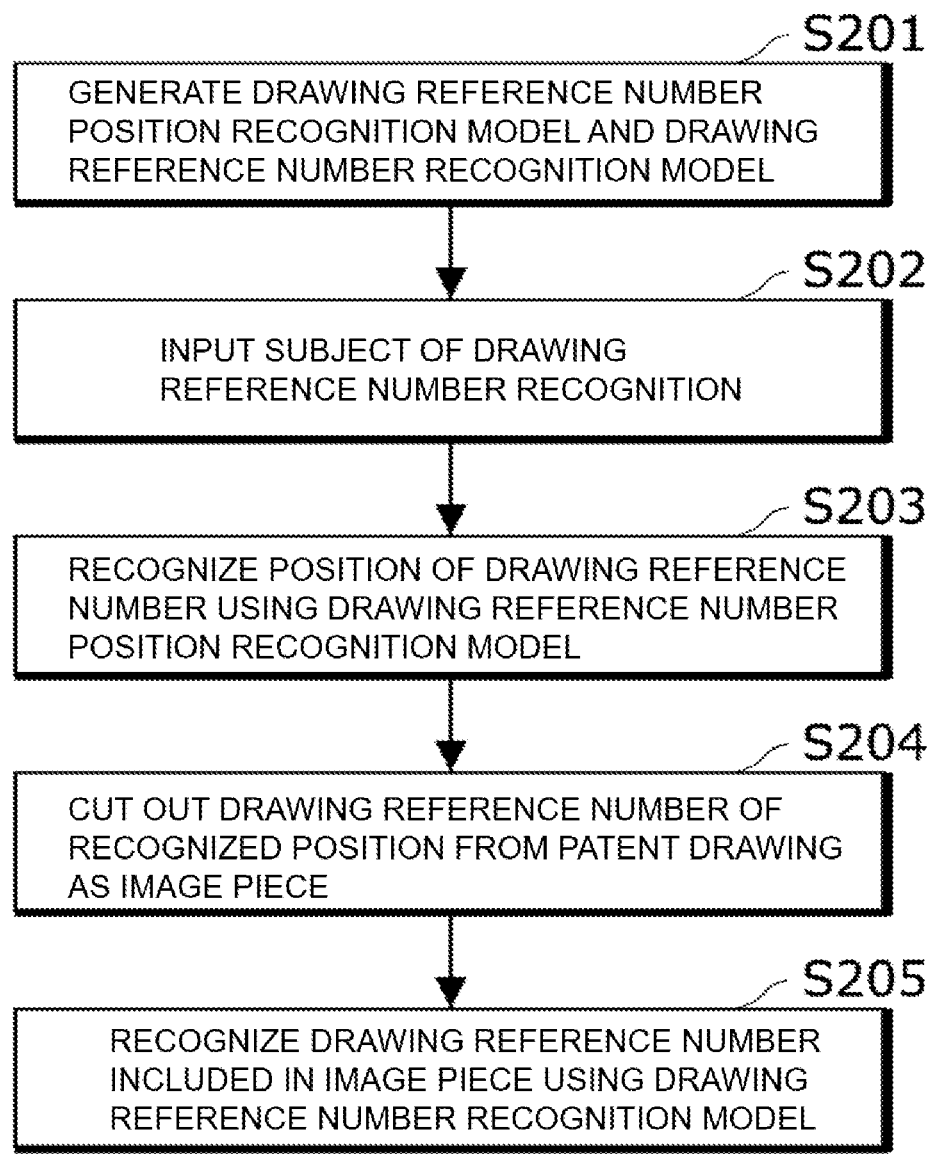
FIG. 2 is a flowchart relating to a drawing reference number recognition method according to an embodiment of the present disclosure.

FIG. 2 is a flowchart related to a drawing reference number recognition method according to an embodiment of the present disclosure.

Referring to FIG. 2, first of all, a web server may learn a plurality of patent drawing samples and build a drawing reference number position recognition model and a drawing reference number recognition model (S201). The drawing reference number position recognition model and the drawing reference number recognition model may both be built based on a deep learning technique.

More specifically, the web server may recognize positions of drawing reference numbers included in the plurality of patent drawing samples based on the deep learning technique. Here, Fully Convolutional Network (FCN) may be exemplified as being used in this case as the deep learning technique. FCN is a deep learning model useful for checking presence or absence of a character within an image pixel. It is a modified model derived based on Convolutional Neural Networks (CNN). Unlike an existing CNN, FCN is characterized of using only a convolution layer instead of a fully connected layer (that is, convolutionalization). Due to this feature, FCN does not lose position information of an image, unlike CNN, so it can be very usefully in recognizing position information of an object (especially character) included in the image.

The web server may use this FCN to recognize positions of the drawing reference numbers included in the plurality of patent drawing samples, and it is possible to extract common features from the recognized positions of the drawing reference numbers. For example, the web server may extract, as the common features of the positions of the drawing reference numbers, that they are not positioned at the center of the drawings, that they are not positioned on outlines of the drawings, and that the drawing reference numbers are not positioned to overlap each other, etc. Besides these, the web server may learn the positions of the drawing reference numbers and extract common features in various ways as a result of learning, and there is no limitation to the features listed above. The web server may generate the drawing reference number position recognition model based on the common features extracted as such. The drawing reference number position recognition model may receive input of a patent drawing, and may recognize a position of a drawing reference number included in the corresponding patent drawing based on the extracted common features, and output the same.

In other words, the web server may learn the positions of the drawing reference numbers included in the plurality of patent drawing samples and extract common features, and generate the drawing reference number position recognition model based on the extracted common features.

The web server that built the drawing reference number position recognition model may use the drawing reference number position recognition model to generate the drawing reference number recognition model. This will be described in detail with reference to FIG. 3.

Figure 3:
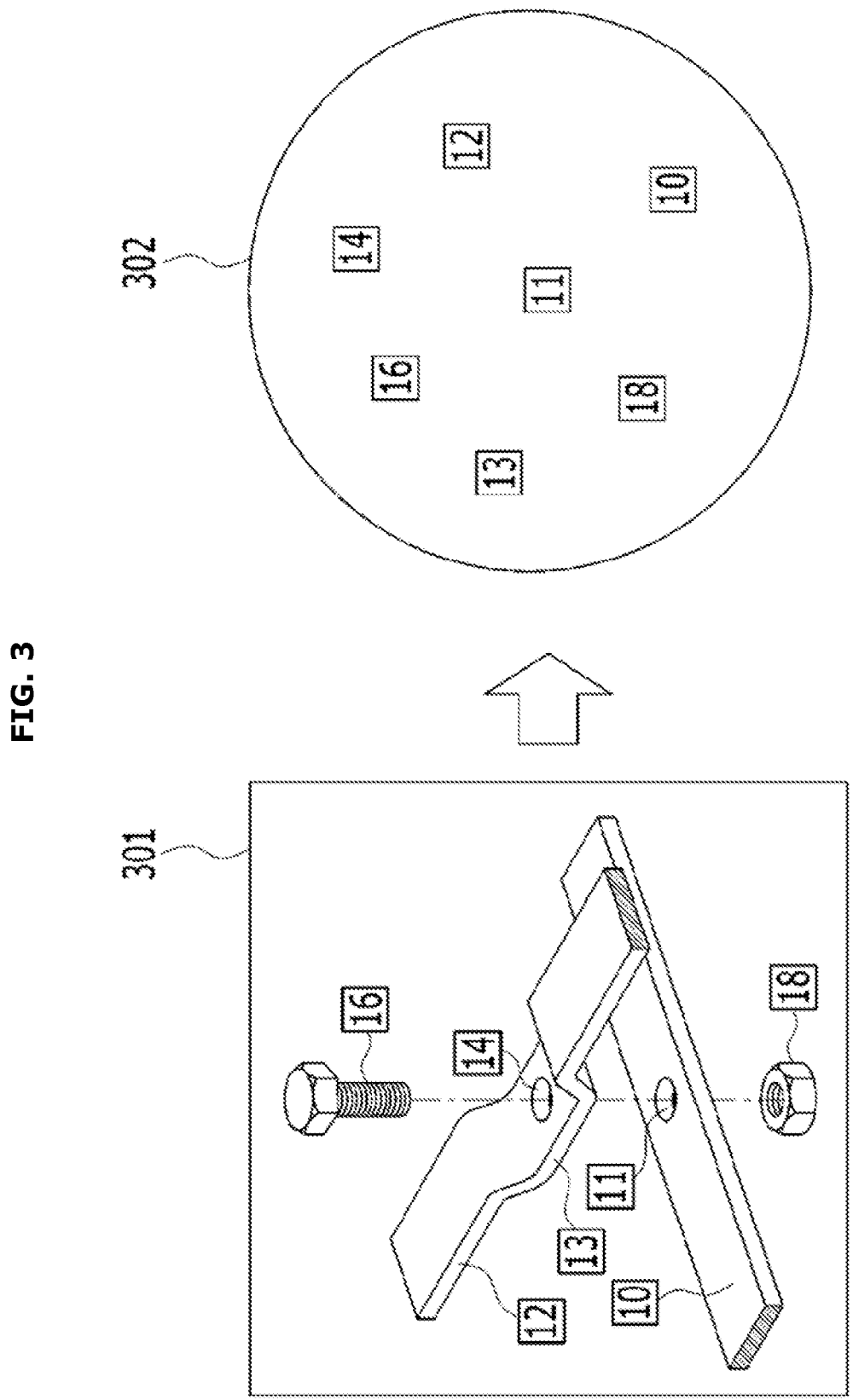
FIG. 3 is a view exemplifying a method for building a drawing reference number recognition model according to an embodiment of the present disclosure.

FIG. 3 is a view exemplifying a method for generating a drawing reference number recognition model according to an embodiment of the present disclosure.

In order to generate the drawing reference number recognition model, first of all, the web server may recognize positions of drawing reference numbers 10~14, 16, 18 included in the patent drawing sample(s) 301 using the drawing position recognition model built in advance. The web server may cut out and collect the drawing reference numbers 10~14, 16, 18 of the positions recognized as such from the patent drawing sample(s) 301 as image pieces 302. The web server may recognize the drawing reference numbers 10-14, 16, 18 included in each of the collected image pieces 302 using the image character recognition technology (for example, deep learning technique (especially, C-RNN) and/or Optical Character Recognition (OCR), etc.).

The reason for recognizing the drawing reference numbers 10~14, 16, 18 after cutting them into small images as described above is because recognizing the drawing reference numbers 10~14, 16, 18 within the image piece 302 that includes only the drawing reference numbers not only has high recognition rate and recognition accuracy but also has very fast recognition speed compared to recognizing the drawing reference numbers 10~14, 16, 18 in the entire patent drawing 301. In fact, as a result of performing a recognition simulation after cutting the drawing reference numbers into small images as in the present method, the recognition accuracy was recorded to be 99.43% while the drawing reference number recognition time was recorded to be within 0.02 second for each drawing, a level where even real time recognition of drawing reference numbers per drawing is possible.

The web server may extract common features from the drawing reference numbers 10~14, 16, 18 recognized as described above and generate the drawing reference number recognition model. The web server may derive common features such as, for example, a feature that the drawing reference numbers consist of numbers, English characters or a combination thereof, a feature that the drawing reference numbers have a length not more than five letters, but there is no limitation thereto.

Based on the common features extracted as described above, the web server may generate the drawing reference number recognition model. The drawing reference number recognition model may recognize the drawing reference number included in each image piece based on the extracted common features and output the same.

In other words, the web server may learn the drawing reference numbers included in the image pieces and extract common features, and generate the drawing reference number recognition model based on the extracted common features.

The drawing reference number position recognition model and the drawing reference number recognition model built as described above are used to recognize the drawing reference numbers in patent drawings selected/input by the user.

Referring to FIG. 2 again, next, the web server may receive input/selection of a patent drawing that is a subject of the drawing reference number recognition (S202). More specifically, the web server may receive selection/input of a certain patent drawing (or certain patent drawing) from a user apparatus that is a client apparatus.

Next, the web server may recognize a position of a drawing reference number included in the input/selected patent drawing using the drawing reference number position recognition model built at S201 step (S203), and cut out the drawing reference number of recognized position from the patent drawing and acquire an image piece that includes the drawing reference number (S204). The web server may recognize the drawing reference number included in the image piece acquired as described above using the drawing reference number recognition model built at S201 step (S205). Here, depending on the embodiment, the web server may gather the image piece in predetermined number units (for example, two hundred) to generate one image, and may recognize the plurality of drawing reference numbers included in the plurality of image pieces included in the generated image using an image character recognition technique (for example, deep learning technique (especially, C-RNN) and/or Optical Character Recognition (OCR)). Besides the above, detailed description related to S203 to S205 steps are substantially the same as described in FIG. 3, and thus repeated description will be omitted.

According to the embodiment proposed in FIGS. 2 and 3, the web server grasps the positions of the drawing reference numbers first and then selectively recognizes only the drawing reference numbers of specific positions, and thus compared to prior art technology of recognizing the drawing reference numbers regarding the entire drawings, it is possible to not only drastically shorten the recognition time (that is, improve recognition speed), but also drastically improve the recognition accuracy of drawing reference numbers.

Figure 4:
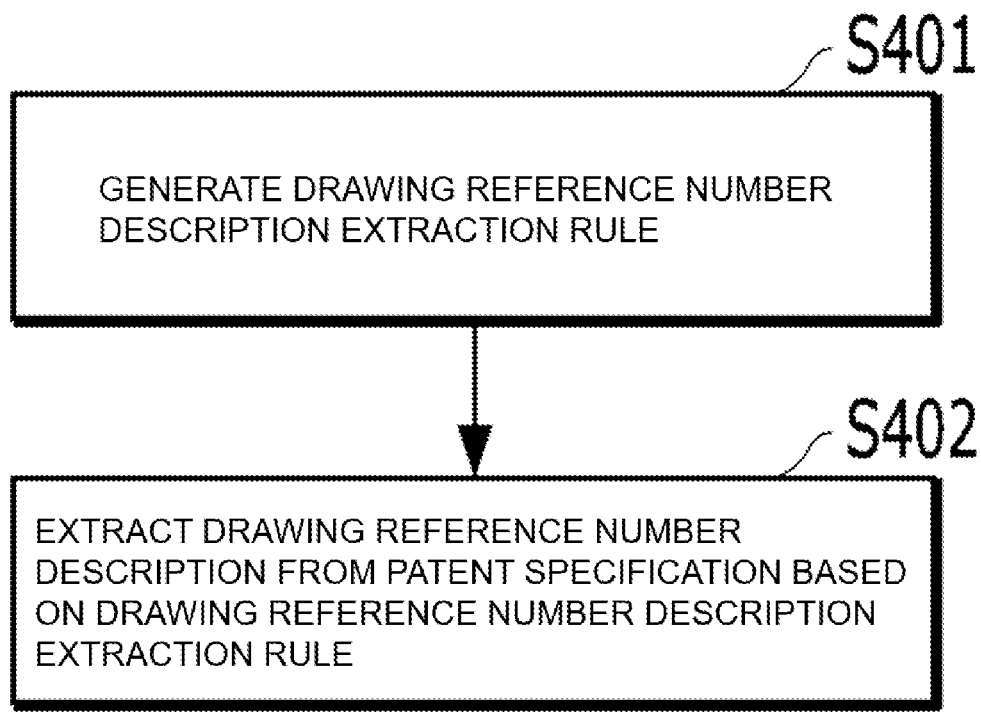
FIG. 4 is a flowchart relating to a method for extracting a drawing reference number description according to an embodiment of the present disclosure.

FIG. 4 is a flowchart regarding a method for extracting a drawing reference number description according to an embodiment of the present disclosure.

According to an embodiment of the present disclosure, the web server may extract a drawing reference number description from a patent specification. A patent literature may be broadly categorized into a patent specification and drawings, where the drawing reference number descriptions may be extracted from the patent specification. The composition of the patent literature will be described in detail hereinafter with reference to FIG. 10. Especially, the web server may extract the drawing reference number descriptions corresponding to the drawing reference numbers recognized according to the embodiment proposed in FIGS. 2 and 3 from the patent specification.

For this purpose, first, the web server may generate a rule for extracting a drawing reference number description (S401). The rule for extracting a drawing reference number description may be generated in various embodiments/methods, but in the present specification, paying attention to the fact that the formats of patent literatures vary by country where the patent literatures are filed, an embodiment of generatement is proposed as the below based on text mining technique.

First, the web server may classify the plurality of patent specification samples by country of filing, and then extract common features for each country of filing. The common features may be extracted based on at least one of a relative position of a drawing reference number description based on a drawing reference number, a drawing reference number description or format applied to the drawing reference number, and year of filing, etc.

For example, for Republic of Korea, a feature that a drawing reference number description is positioned in front of the drawing reference number, and a feature that the drawing reference number is written inside parentheses may be extracted as common features, and for USA, a feature that a drawing reference number description is positioned in front of the drawing reference number, a feature that bold text formatting is applied to drawing reference numbers, and a feature that a drawing reference number is not distinguished using parentheses unlike the Republic of Korea may be extracted as common features. Depending on the country of filing, there are cases where there is a separate 'reference number description' category where drawing reference numbers and drawing reference number descriptions are written, which may also be extracted as a common feature, and the 'drawing reference number description' category may be used to extract a drawing reference number description afterwards. Besides the above, the result of learning various patent specification samples shows that the web server may extract common features by each country of filing in various ways.

The web server may generate a drawing reference number description extraction rule (or model) based on the common features extracted as described above, and then use this rule (or model) to extract a drawing reference number description from the patent specification (S402).

More specifically, if the drawing reference number description extraction rule is generated based on the relative position of a drawing reference number description compared to the drawing reference number (or if the drawing reference number description extraction rule includes a relative position rule of drawing reference number descriptions), the web server may search drawing reference numbers included in the patent specification. Moreover, the web server may predict the position of the drawing reference number description corresponding to the drawing reference number searched according to the generated relative position rule, and extract the character of the predicted position as the drawing reference number description.

For example, in a case where the rule that a drawing reference number description is positioned in front of the drawing reference number is generated, the web server may search drawing reference number 16 from the patent specification disclosing as below and then extract the character written in front of the drawing reference number 16, 'bolt', as the drawing reference number description.

bolt (16)

In the case above where the drawing reference number description consists of one word, there is low possibility of error in extracting the drawing reference number description, but in a case of a compound word consisting of a plurality of words, there may be ambiguity as to which word should be extracted as the drawing reference number description. In order to solve this ambiguity, embodiment of FIG. 5 is proposed in the present specification.

Figure 5:
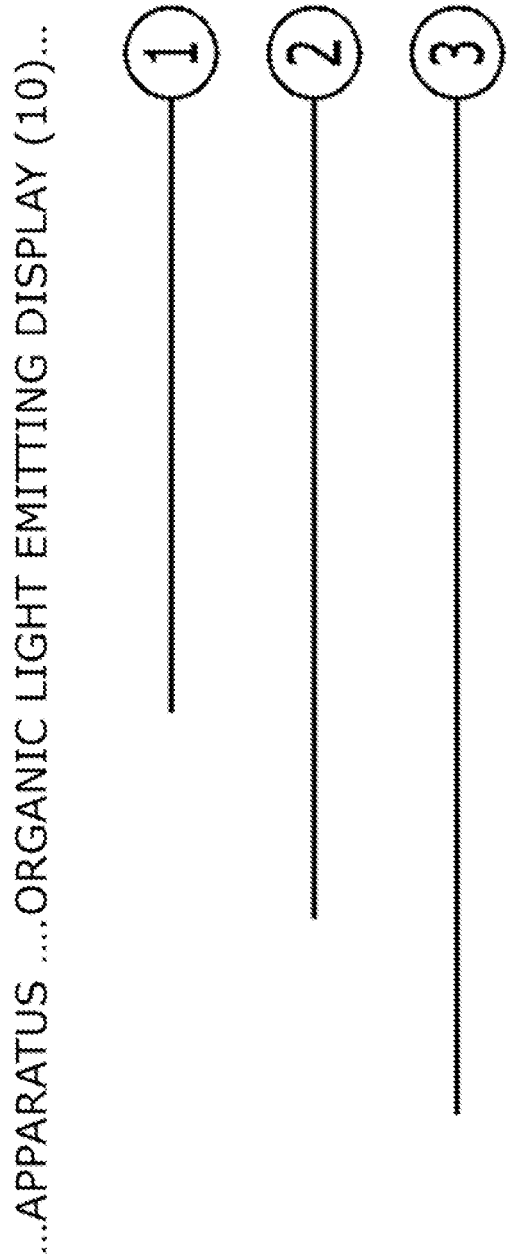
FIG. 5 is a view exemplifying an embodiment of extracting a drawing reference number description according to an embodiment of the present disclosure.

FIG. 5 is a view exemplifying an embodiment of extracting a drawing reference number description according to an embodiment of the present disclosure.

In the present disclosure that extracts a drawing reference number description based on the relative position regarding the drawing reference number, in the case of a compound word such as 'organic light emitting display (10)' exemplified in the present drawing, a problem may occur that it is unclear to which degree the extraction should be made as the drawing reference number description. For example, in the case of extracting a drawing reference number description based on the rule that the drawing reference number description is positioned in front of the drawing reference number, from the example of FIG. 5, 'display (①)', 'light emitting display (②)' and 'organic light emitting display (③)' may be extracted as the drawing reference number description.

Therefore, in the present specification, in order to solve such unclarity/ambiguity, in a case where a plurality of drawing reference number descriptions are extracted, an embodiment for selecting an accurate drawing reference number description is proposed as below.

In an embodiment, when a plurality of drawing reference number descriptions are extracted, the web server may search the extracted plurality of drawing reference number descriptions in the patent specification and then extract the drawing reference number description searched the most as a final drawing reference number description and extract the same. In the present drawing for example, if as a result of the web server searching each of the display, light emitting display and organic light emitting display in the patent specification, if the organic light emitting display is searched three times, 0 time for the light emitting display, and one time for the display, the organic light emitting display may be extracted as the final drawing reference number description.

Here, the number of words that the web server extracts as candidates of the drawing reference number description may be limited to a predetermined number based on drawing reference number description data accumulated so far. In more detail, the web server may make a database of a drawing reference number and drawing reference number description recognition result, and generate a patent drawing search database. In this case, based on the drawing reference number description data accumulated in the database so far, the web server may get a statistics of the number of words of a compound word extracted as the drawing reference number description, and set the number of words with a statistically low extraction ratio/probability as a limitation number. For example, if the web server analyzed the drawing reference number description data accumulated so far, and the ratio that a compound word of five or more words to be extracted as a drawing reference number description was 0.0001%, the web server may limit the number of words extractable as the drawing reference number description to a maximum of four. In this case, when extracting the drawing reference number description according to the drawing reference number description extraction rule, the web server can extract only up to a maximum of four words as the drawing reference number description.

Although not illustrated in the present flowchart, in order to further improve the accuracy of extracting the drawing reference number description, the web server may generate an error extraction rule for determining presence of error in the extracted drawing reference number description, and may correct/modify the discovered error.

In more detail, the web server may extract a drawing reference number description from a patent specification sample(s) based on the generated drawing reference number description extraction rule, and search the extracted drawing reference number description from the patent specification. If the search result shows that there is a drawing reference number description that is not searched in the patent specification, the web server may classify that drawing reference number description as the drawing reference number description that has an error. As such, the web server may extract (that is, learn) a common feature from the drawing reference number description that has an error, and generate an error extraction rule (or model). The web server may use the error extraction rule generated as described above in determining the presence of an error in the drawing reference number description extracted from the patent specification.

Examples of the common feature includes a feature of number 0 being erroneously extracted as alphabets o, O, or D; a feature of number 9 being erroneously extracted as number 0; a feature of a part of speech that is not a noun such as an adjective, connecting word, and adverb being extracted, and a feature of symbols such as !, @, #, $, %, ^, (,) being extracted, etc.

When it is determined that there is an error in the drawing reference number description based on an generated error extraction rule, the web server may correct/modify the extracted the drawing reference number description according to a predetermined method. For example, upon finding that a number/alphabet is erroneously recognized as an alphabet/number, the web server may replace the number/alphabet with a corresponding alphabet/number, and upon finding an error that includes a part of speech or symbol that is not a noun, the web server may delete that part of speech or symbol.

Moreover, based on the deep learning technique (CNN, Recurrent Neural Network (RNN), or a combination thereof), the web server may learn the generated drawing reference number description extraction rule and the error extraction rule, and generate a drawing reference number description extraction model having further improved performance. Especially, the web server may utilize an answer set regarding the drawing reference numbers and the drawing reference number descriptions accumulated so far in the already built patent drawing search database to generate a drawing reference number description extraction model having excellent recognition rate and accuracy, and use it for extracting the drawing reference number description.

Meanwhile, although not separately mentioned above, in order to extract mutually corresponding drawing reference number and drawing reference number description, the drawing reference number needs to be recognized with high accuracy in the specification as well and not only in the drawings. That is because the drawing description extraction rule proposed in the present specification is based on a premise that a drawing reference number description is extracted based on the 'drawing reference number'. That is, it can be seen that the specification and the drawings are mutually interlocked having the drawing reference numbers as a medium. Therefore, the web server may determine whether a drawing reference number is accurately extracted from each of the specification and the drawings, and may modify the drawing reference number which was determined to have been extracted inaccurately. By doing this, the matching accuracy between the drawing reference number and the drawing reference number description can be further improved.

As a first embodiment of the above, the web server may mutually match a drawing reference number extracted through the drawings with the drawing reference number included in the patent specification, thereby improving the drawing reference number recognition accuracy regarding the drawings. In more detail, according to the embodiment described above, the web server may search a drawing reference number recognized in the patent drawing, in the patent specification corresponding to that patent drawing. If the drawing reference number recognized in the patent drawing is searched in the patent specification, the web server may determine that the recognized drawing reference number is a suitable drawing reference number and determine it as a final drawing reference number. On the other hand, if the recognized drawing reference number is not searched in the patent specification, the web server may determine that the corresponding drawing reference number is not a suitable drawing reference number, and search for a character/word/term having a shape similarity with the corresponding drawing reference number that is greater than or equal to a predetermined ratio in the patent specification, and determine it as the final drawing reference number.

For example, in a case where 36D is recognized through the drawings, but 36D is not searched in the actual specification, the web server may determine 360 having the highest shape similarity with 36D as the final drawing reference number.

Similarly, in a second embodiment, the web server may mutually match a drawing reference number recognized through the specification with the drawing reference number recognized in the drawings, thereby improving the drawing reference number recognition accuracy regarding the specification. In more detail, according to the embodiment described above, the web server may search a drawing reference number recognized in the patent specification, from among the drawing reference numbers recognized from the patent drawings corresponding to that patent specification. If the drawing reference number recognized in the patent specification is searched from among the drawing reference numbers recognized from the patent drawings, the web server may determine the recognized drawing reference number as a suitable drawing reference number and determine it as a final drawing reference number. On the other hand, if the recognized drawing reference number is not searched from among the drawing reference numbers recognized from the patent drawings, the web server may determine that the corresponding drawing reference number is not a suitable drawing reference number, and may explore a character/word/term having a shape similarity that is greater than or equal to a predetermined ratio with the corresponding drawing reference number, and determine it as the final drawing reference number.

For example, in a case where 36D is recognized through the patent specification, but 36D is not searched from among the drawing reference numbers recognized through the actual patent drawings, the web server may determine 360 having the highest shape similarity with 36D, from among the drawing reference numbers recognized in the patent drawings, as the final drawing reference number.

That is, according to a first embodiment of the present disclosure, the web server may match the drawing reference number recognized in the patent drawings with the drawing reference number recognized in the patent specification and modify it, and according to a second embodiment of the present disclosure, the web server may match the drawing reference number recognized in the patent specification with the drawing reference number recognized in the patent drawings, and modify it.

The aforementioned first and second embodiments may be selectively used, or used at the same time in combinations depending on the purpose and effects. When using them at the same time in combinations, only the drawing reference number that mutually matches between the patent drawings and the patent specification can be determined/extracted/finalized as the final drawing reference number, in which case the drawing reference number recognition error probability can be significantly reduced compared to when selectively applying the first and the second embodiments.

So far, the method for recognizing a drawing reference number and a drawing reference number description was described. Hereinbelow, a method for replacing a drawing reference number recognized as described above with a drawing reference number description, and outputting the same will be proposed.

Especially, the drawing reference number description outputting method that the present specification proposes has a feature that, unlike in prior art, a relative position in the drawing is always maintained/fixed the same regardless of any state change of the drawing itself (for example, movement, rotation, enlargement or reduction), and thus even if a user changes the state of the drawing itself, the drawing reference number description can always accurately track the position of the drawing reference number and replace it.

Figure 6:
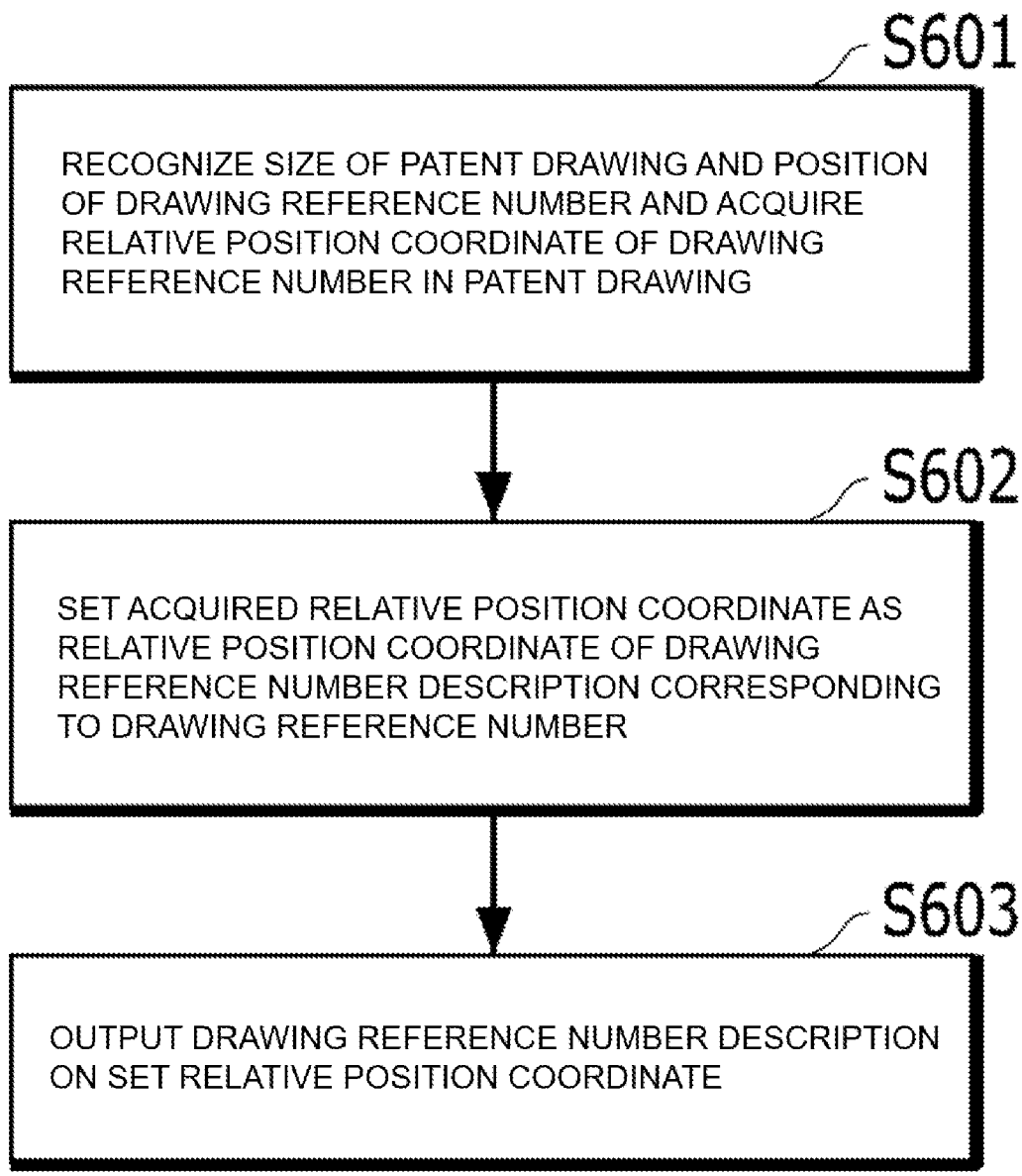
FIG. 6 is a flowchart exemplifying a method for outputting a drawing reference number description corresponding to a drawing reference number according to an embodiment of the present disclosure.

FIG. 6 is a flowchart exemplifying the method for outputting a drawing reference number description corresponding to a drawing reference number according to an embodiment of the present disclosure.

Referring to FIG. 6, first of all, the web server may recognize the size of a patent drawing and the position of a drawing reference number included in the patent drawing, and acquire a relative position coordinate of the drawing reference number in the patent drawing (S601). In other words, the web server may acquire a relative position coordinate of a drawing reference number in relation to the size of a patent drawing. The reason for acquiring such a relative position coordinate is to track the accurate position of the drawing reference number even when the state of the drawing changes as described above.

Next, the web server may set the relative position coordinate acquired at the previous step as a relative position coordinate of the drawing reference number description corresponding to the drawing reference number (S602).

Lastly, the web server may output the drawing reference number description on the set relative position coordinate (S603). Here, the drawing reference number description being output may be output in the form of an icon/Graphic User Interface (GUI) having a nontransparent background color, and since it is output on the same relative position coordinate as the drawing, it will cover at least a portion of the drawing reference number. That is, since the drawing reference number description is output on the same position as the drawing reference number in the drawing, the drawing reference number description will be output to replace the drawing reference number. For example, in the drawing of (a) of FIG. 1, all the drawing reference numbers will be replaced by the drawing reference number descriptions as in (b) of FIG. 1.

Although the present embodiment exemplifies the case where a drawing reference number description is output to cover at least a portion of the drawing reference number, there is no limitation thereto, and thus a drawing reference number description may be output on any position corresponding to the drawing reference number (for example, upper/lower/left/right/diagonal/neighboring directional position of the drawing reference number including the position of covering at least a portion). When outputting a drawing reference number description on an area neighboring the drawing reference number, the web server may move the relative position coordinate of the drawing reference number acquired at S601 step in a predetermined direction and/or predetermined distance, and set/allocate it as the relative coordinate of the drawing reference number description. Hereinbelow, for convenience of description, specific embodiments for replacing a drawing reference number with a drawing reference number description will be described based on the embodiment of FIG. 6 described above.

Figure 7:
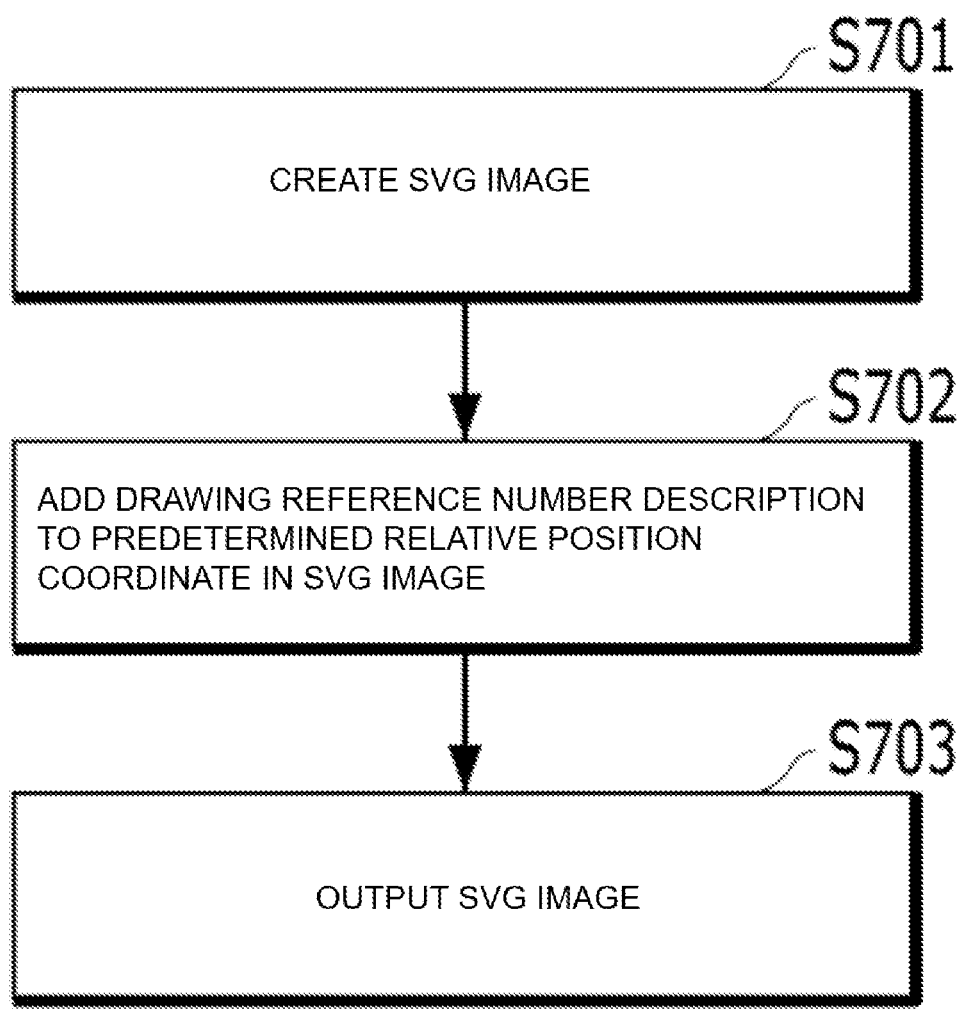
FIG. 7 is a flowchart exemplifying a method for outputting a drawing reference number description using a Scalable Vector Graphics (SVG) image according to an embodiment of the present disclosure.
Figure 8:
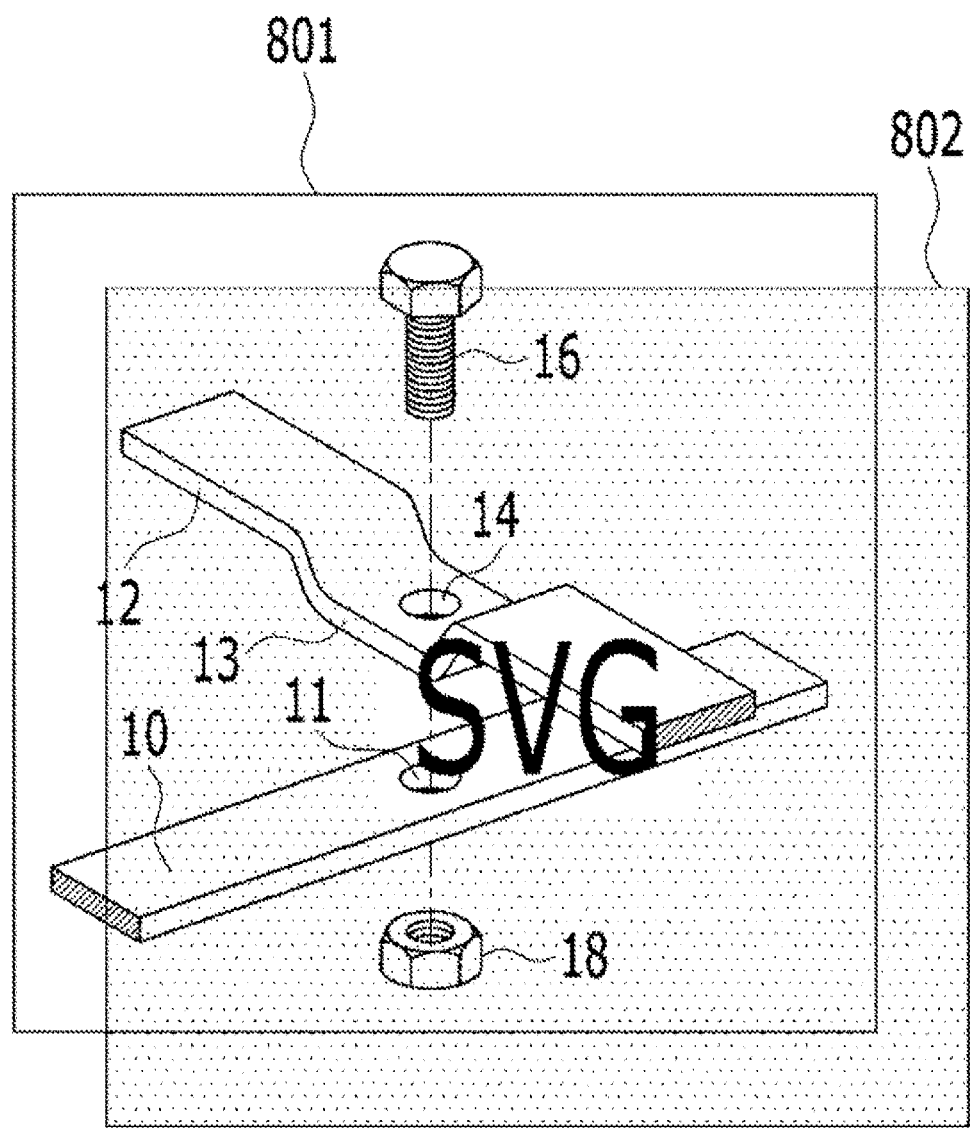
FIG. 8 is a view exemplifying a method for outputting a drawing reference number description using an SVG image according to an embodiment of the present disclosure.
Figure 9:
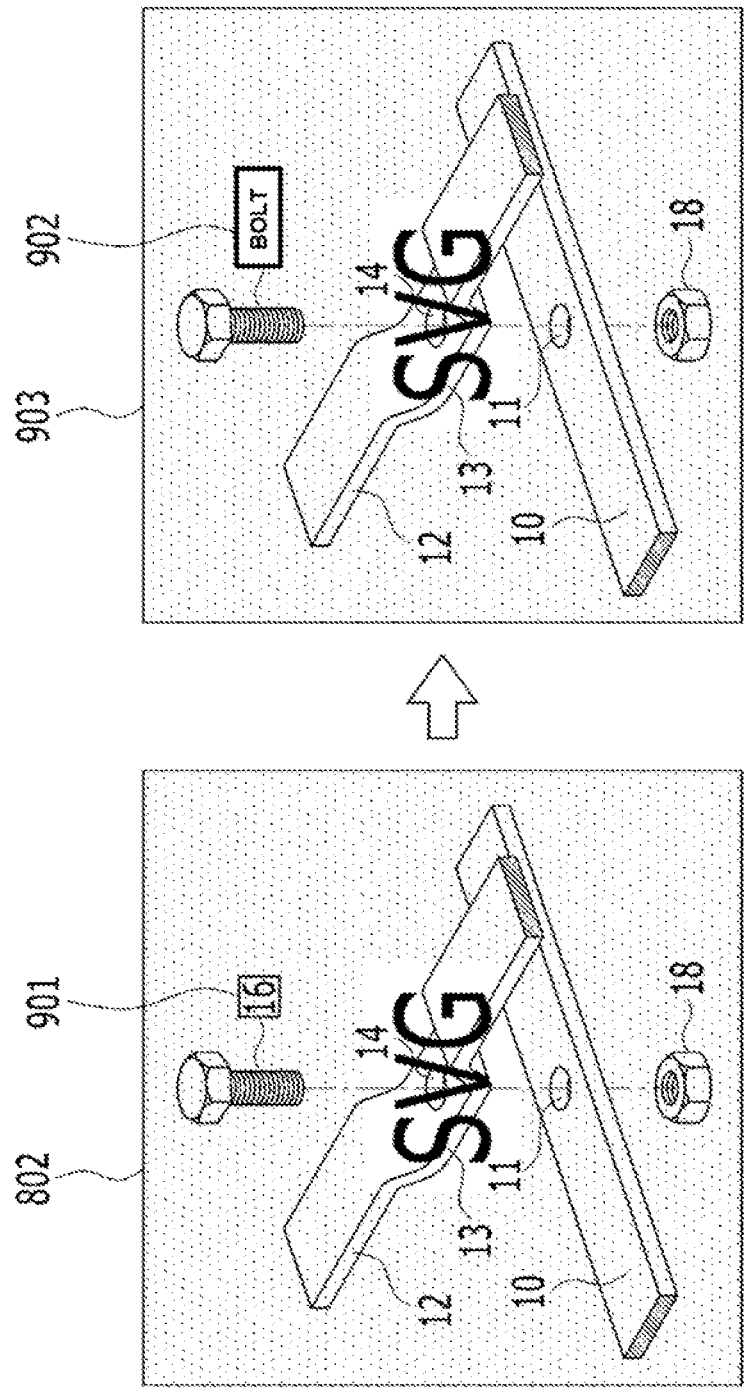
FIG. 9 is a view exemplifying a method for outputting a drawing reference number description using an SVG image according to an embodiment of the present disclosure.

FIGS. 7 to 9 are flowcharts exemplifying a method for outputting a drawing reference number description using an SVG image according to an embodiment of the present disclosure.

In more detail, FIG. 7 is a flowchart exemplifying a method for outputting a drawing reference number description using a Scalable Vector Graphics (SVG) according to an embodiment of the present disclosure, and FIGS. 8 and 9 are views exemplifying a method for outputting a drawing reference number description using an SVG image according to an embodiment of the present disclosure.

Referring to FIGS. 7 and 8, first of all, the web server may generate an SVG image 802 of the same size as a patent drawing 801, and then overlap the SVG image 802 on the patent drawing 801, and then fix it on the patent drawing 801 (S701). In other words, the web server may generate a transparent SVG image 802 having the same size as the patent drawing 801, and then fix it on the patent drawing 801 in a state that the SVG image 802 covers an entirety of the patent drawing 801. As a result, the SVG image 802 will have a feature that although the user cannot recognize it, the state of the SVG image 802 will change identically as the change of state of the patent drawing 801. It should be noted that an SVG image has an image file format that is based on Extensible Markup Language (SML) for expressing two-dimensional vector graphics, and thus the SVG image has a feature that its quality does not deteriorate even when the state of the image changes (especially, enlargement).

Referring to FIGS. 7 and 9, next, the web server may engrave/add/mark/assign 903 a drawing reference number description 902 on a predetermined relative position coordinate 901 on the SVG image 802 (S702). Here, the predetermined relative position coordinate 901 may mean the relative position coordinate of the drawing reference number and the drawing reference number description acquired at S601 and S601 steps of FIG. 6. The drawing reference number description 902 may be engraved/added/marked/assigned on the SVG image 802 in the form of an icon/GUI format having a nontransparent background color.

As a result, in the SVG image 802, on the position 901 corresponding to the drawing reference number, the drawing reference number description 902 will be engraved/added/marked/assigned 903. The web server may overlap, on the drawing 801, the SVG image 903 where the drawing reference number description 902 is engraved/added/marked/assigned, and output the same, and as a result, the drawing reference number of the drawing 801 will be covered by the the drawing reference number description 902 engraved/added/marked/assigned on the SVG image 903.

For example, if the drawing reference number description 902 for the drawing reference number '16' of the drawing 801 is 'bolt', an SVG image 903, where 'bolt' 902 is engraved/added/marked/assigned on the same position as the drawing reference number '16', may be generated, and as a result of the SVG image 903 being overlapped with the drawing 801 and then being output, the drawing reference number '16' may be covered by 'bolt' 902. As a result, there is an effect that for the user, it would seem that the drawing reference number '16' is replaced by 'bolt' 902.

In other words, in the present embodiment, the web server may generate the SVG image 903 where the drawing reference number description 902 is engraved/added/marked/assigned on the position 901 corresponding to the drawing reference number, and may match/interlock/correspond the such generated SVG image 903 on the drawing 801 and output the same. As a result, the drawing reference number of the drawing 801 will be replaced by the drawing reference number description, and be output.

Due to the nature of the SVG image, it is free to change state without degrading the quality, and as long as a drawing reference number description is an object/component constituting the SVG image and has a position coordinate assigned in the image, the position coordinate of the drawing reference number description is scaled automatically according to the state change of the SVG image, and thus there is no need to recalculate the position coordinate. Drawing reference numbers in the drawings are also included as image objects constituting the drawing image, and in the SVG image, a drawing reference number description is displayed on the position corresponding to the drawing reference number (or engraved, added, or assigned), and thus the position coordinate of the drawing reference number and the drawing reference number description that are components of the image are automatically scaled according to the state change the two interlocked images, and the position moved as a result of the scaling also becomes the same. Therefore, even when there is a state change of the patent drawing (for example, move, rotation, enlargement or reduction), the state of the SVG image fixed on the patent drawing also changes identically as the patent drawing, and as a result, the relative position of the drawing reference number description engraved/added/displayed/assigned on the SVG image, in the SVG image, does not change either but is fixed even if the SVG image is moved, rotated, or reduced.

When using the SVG image, a certain format (example, yellow highlight mark, etc.) may be displayed on the drawing reference number position, so that the web server can let the user know about the drawing reference number of which recognition has currently been completed, and as such, on the position marked with a certain format, the drawing reference number description may be displayed like a tool tip using HTML, etc.

According to the present embodiment, compared to the existing method of tracking/recalculating the position of a drawing reference number every time and assigning a drawing reference number description according to a change of state of the drawing, there is an effect that the speed of replacement of the drawing reference number description is very fast. Especially, in the case of the existing/conventional method, since the position of a drawing reference number has to be tracked/recalculated every time according to the change of state of the drawing, the speed of replacement is very slow, and thus the drawing reference number description could be replaced/output only for one drawing reference number at a time, whereas according to the present disclosure, the replacement speed is very fast, thus allowing an operation of replacing/outputting all the drawing reference numbers (that is, a plurality of drawing reference numbers) included in one drawing at once.

Meanwhile, although not illustrated in the present drawing, as a result of assigning a relative position coordinate to all the drawing reference number descriptions, there may be cases where at least some of the drawing reference number descriptions overlap on the SVG image. In this case, the web server may arbitrarily adjust the relative position coordinate of at least one of the overlapping drawing reference number descriptions in a mutually non-overlapping direction, and then engrave/add/mark/assign it on the SVG image. For example, in the case where a first drawing reference number description and a second drawing reference number description mutually overlap each other, the web server may move the first drawing reference number in a first direction, and move the second drawing reference number in a second direction, that is an opposite direction to the first direction, by a predetermined length.

In the present specification, the 'SVG image' has been described as a representative embodiment as the image to be used in outputting a drawing reference number description, but there is no limitation thereto, and images of various formats may of course be utilized. Therefore, in the present specification, the SVG image may be referred to as/replaced with 'image', and here, the 'image' may refer to an image of various formats, such as the 'SVG image, of which the quality is not deteriorated even when a state changes.

Meanwhile, although not separately mentioned in the flowcharts and drawings, in cases where a drawing reference number description of each drawing reference number is already included in the drawing as in block diagrams and flowcharts, instead of replacing the corresponding drawing reference number with the drawing reference number description, the web server may apply a highlighting displaying format to the drawing reference number description. For this purpose, the web server perform an operation for recognizing the characters included in the drawing in advance.

So far, a method for recognizing a drawing reference number, a method for extracting a drawing reference number description, and a method for replacing a drawing reference number with a drawing reference number description were described. Having such extracted/recognized drawing reference number and/or drawing reference number description as a medium, each category of a patent literature may be mutually interlocked/synchronized. As a result, the user becomes able to selectively explore/search desired information using the drawing reference number and/or the drawing reference number description, and thus becomes able to grasp the invention more efficiently. An embodiment of mutual interlock/synchronize of each category of the patent literature will be described hereinbelow with reference to FIGS. 11 to 15, but before that, categories of patent literature defined in the present specification will be briefly reviewed.

Figure 10:
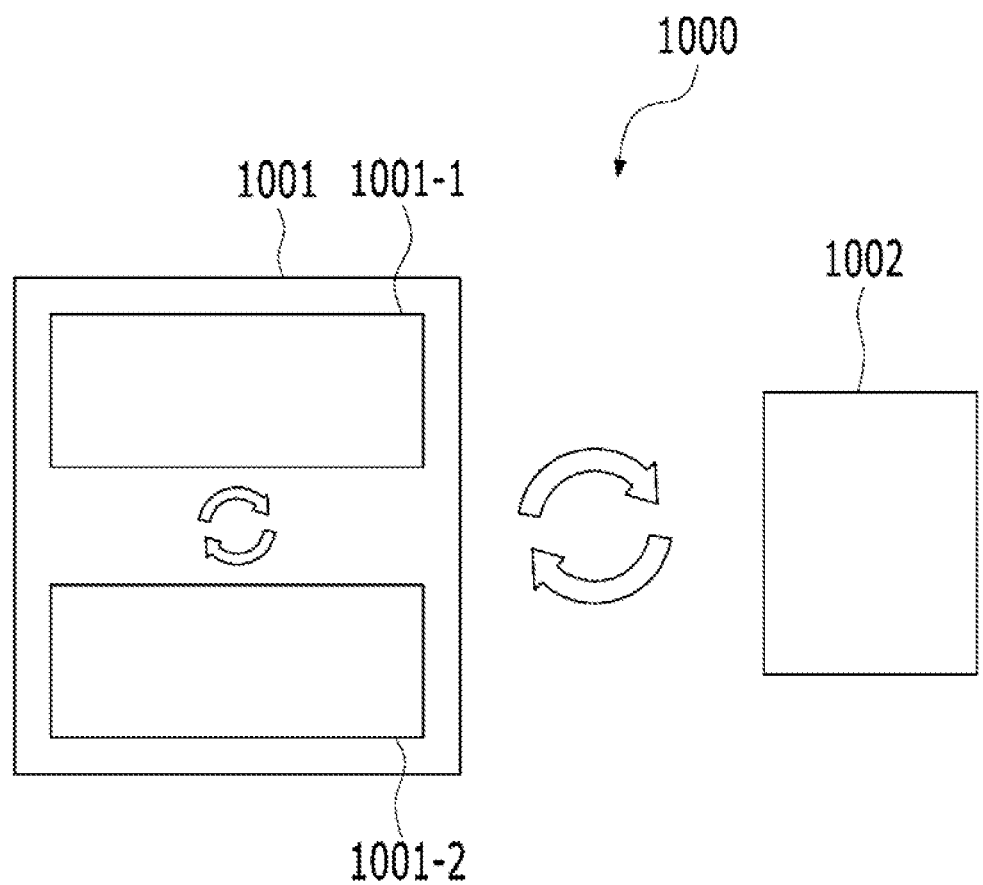
FIG. 10 is a view exemplifying a patent literature according to an embodiment of the present disclosure.

FIG. 10 is a view exemplifying a patent literature according to an embodiment of the present disclosure.

Referring to FIG. 10, the patent literature 1000 may be divided into a plurality of categories 1001, 1002. The patent literature 1000 may be broadly divided into patent specification 1001 and patent drawing 1002, and the patent specification 1001 may again be divided into claims set 1001-1, detailed description 1001-2 and/or reference numbers (not illustrated).

The plurality of categories 1001, 1002 divided as such may be output such that they are divided into a plurality of areas/windows. For example, the patent specification 1001 and the patent drawing 1002 may be output within one window such that they are divided into a first area and a second area that are different from each other. Otherwise, the patent specification 1001 and the patent drawing 1002 may each be output on a first window and a second window that are different from each other. Otherwise, the patent specification 1001 and the patent drawing 1002 may be output such that they are divided by area within one window, and at the same time, the patent specification 1001 or the patent drawing 1002 may be additionally output on a separate window.

The reason for outputting by area/window is to allow all the categories 1001, 1002 to be viewed by the user at once, so that the user can grasp the information more easily and efficiently, thereby providing convenience.

In the present specification, the plurality of categories 1001, 1002 may be mutually interlocked having the drawing reference number and/or the drawing reference number description as a medium.

In more detail, in a case where a selection input regarding a drawing reference number included in any one of the plurality of categories 1001, 1002 is received, the web server may search the drawing reference number in all of the plurality of categories 1001, 1002. Moreover, the web server may apply the highlighting display format regarding the drawing reference number searched in all of the plurality of categories 1001, 1002, and output the same.

If the drawing reference number is searched in the patent specification category 1001, the web server may apply a predetermined format (for example, underline, bold character display, application of different letter color, highlight display, etc.) regarding all the drawing reference numbers searched, and highlight the same. In the same context, in a case where the drawing reference number is searched in the patent drawing reference category 1002, the web server may apply the predetermined format (underline, bold character display, application of different letter color, highlight display, etc.) regarding all the searched drawing reference numbers or all the drawing reference number descriptions output to replace the searched drawing reference numbers, and highlight the same.

For example, in a case where the user selected the drawing reference number '16' from the patent specification category 1001, the drawing including the drawing reference number '16' may be automatically selected/output and then the drawing reference number '16' may be highlighted, or in a case where the drawing reference number '16' is selected in the patent drawing category 1002, the drawing reference number '16' may all be highlighted in the patent specification category 1001 and at the same time an automatic scroll/output operation to sentences/paragraphs that include the drawing reference number '16' may be performed.

In order to receive a user input regarding a drawing reference number, in the patent specification category 1001, a drawing reference number may be output in a hyper link form, and in the patent drawing category 1002, the drawing reference number (or drawing reference number description) may also be output in the form of a selectable GUI/icon.

Figure 11:
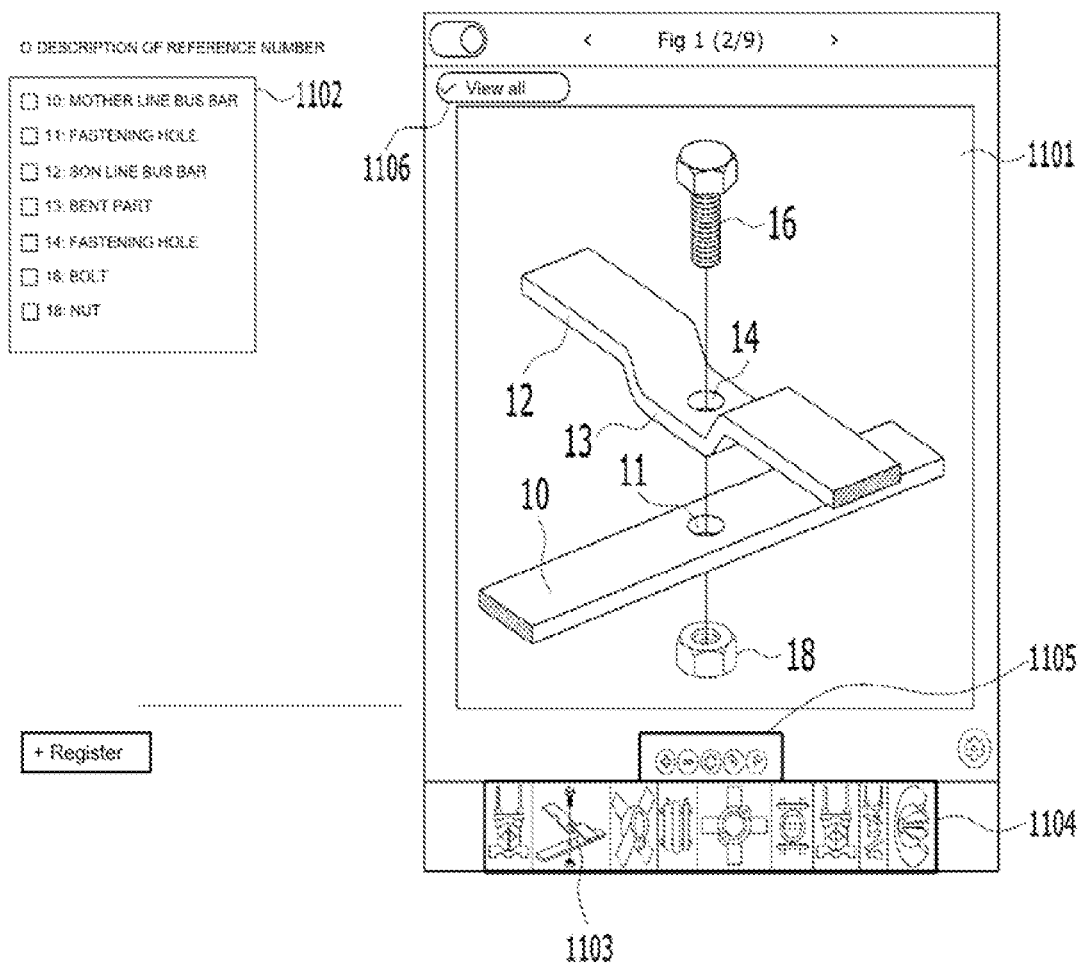
FIG. 11 is a view exemplifying a drawing interface where a drawing reference number and a drawing reference number description are mutually interlocked according to an embodiment of the present disclosure.
Figure 12:
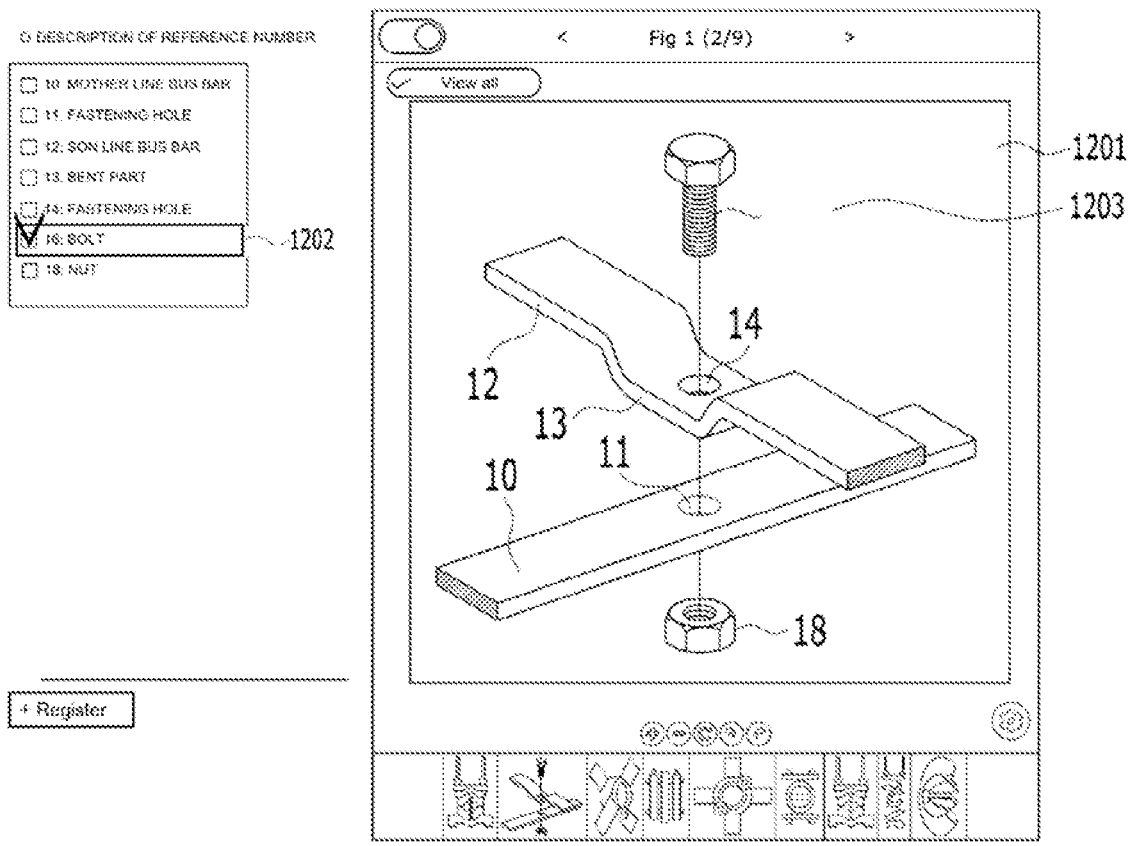
FIG. 12 is a view exemplifying a drawing interface where a drawing reference number and a drawing reference number description are mutually interlocked according to an embodiment of the present disclosure.

FIGS. 11 and 12 are views exemplifying a drawing interface where drawing reference numbers and drawing reference number descriptions are mutually interlocked according to an embodiment of the present disclosure.

The drawing interface proposed in the present specification may be output in a drawing category as a user interface that provides a user with various functions regarding a drawing. Such a drawing interface may basically output a drawing as illustrated in the present drawings. Additionally, the drawing interface may provide various functions related to drawings such as a preview and shortcut function regarding all drawings included in the patent literature, drawing state change (for example, rotation, move, enlargement and reduction of drawing) function, drawing reference number description replacement function, thereby providing user convenience. Here, the drawing reference number description replacement function may correspond to the function where the aforementioned embodiments are applied.

Especially, the drawing interface may provide the user with a function of recognizing all the drawing reference numbers of the selected drawing and extracting all the drawing reference number descriptions corresponding thereto, and listing-up all the extracted drawing reference number descriptions. Here, mutually corresponding drawing reference numbers and drawing reference number descriptions may be mutually matched/paired and be output. For extracting the drawing reference numbers and drawing reference number descriptions, the aforementioned embodiments may apply.

Moreover, as illustrated in FIG. 12, in a case of receiving a user's selection input regarding at least one drawing reference number description (or drawing reference number description) from a drawing reference number description list output through the drawing interface, the web server may selectively output only the selected drawing reference number description (or drawing reference number). For example, as illustrated in FIG. 12, if a user's selection input regarding the bolt 16 is received, the web server may output bolt that is the drawing reference number description for drawing reference number 16 only.

According to the present embodiment, the user may selectively view a desired drawing reference number or drawing reference number description, and thus may easily and efficiently grasp the drawings/invention.

Figure 13:
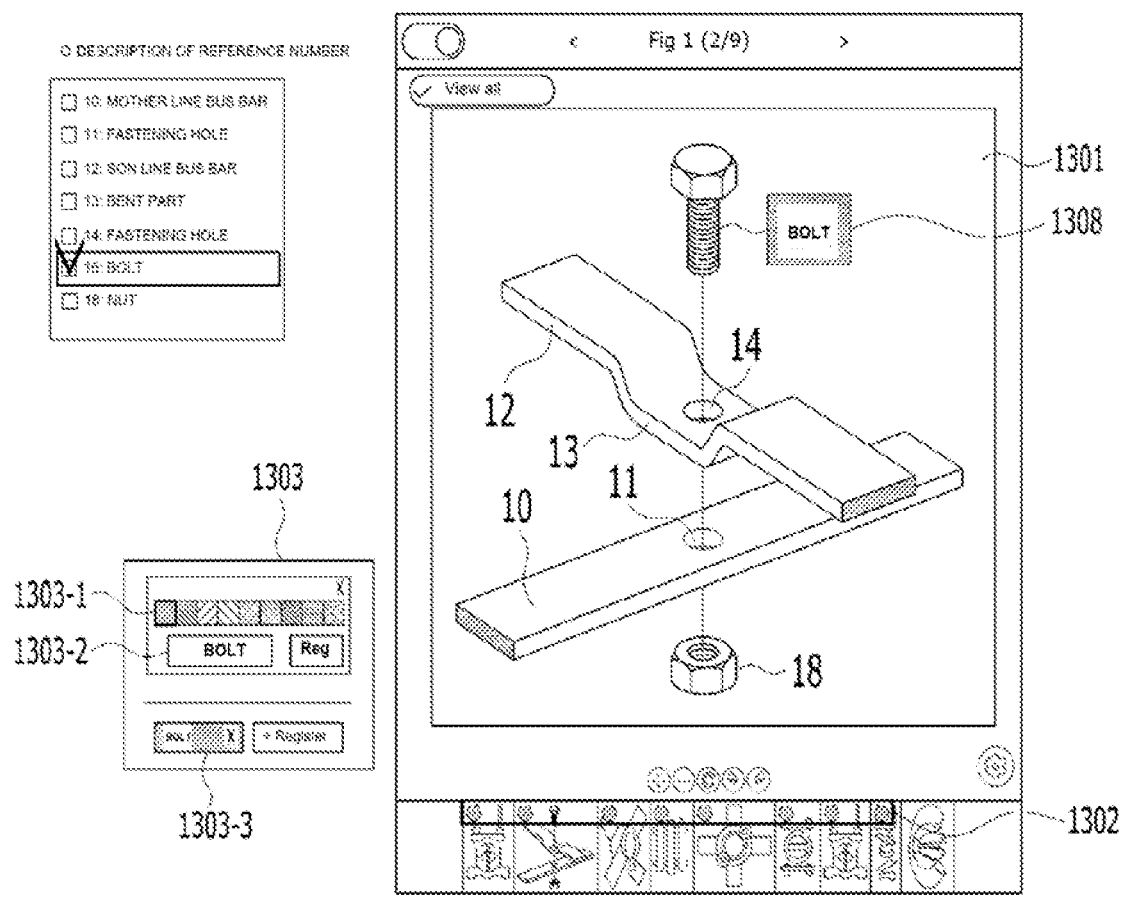
FIG. 13 exemplifies a keyword setting interface according to an embodiment of the present disclosure.

FIG. 13 exemplifies a keyword setting interface according to an embodiment of the present disclosure.

The drawing interface proposed in the present specification may provide a keyword setting interface. The keyword setting interface is a user interface provided through a drawing category in order to allow at least a portion of the drawing reference number descriptions to be set as a keyword.

The keyword setting interface may be configured to include an input window for receiving input of a drawing reference number description to be set as a keyword, a color setting window for setting a highlight color of the set keyword and/or a keyword indicator showing the keywords set so far. However, the keyword setting interface is not limited thereto, and various functions may be added or at least some of the aforementioned functions may be excluded.

Through such a keyword setting interface, of the drawing reference number descriptions, the user may register/set a certain drawing reference number description as a keyword, and the web server may highlight the registered/set keyword in the drawings or highlight the drawings where the registered/set keyword is included so that the user can easily find it.

For example, in a case where the user intends to designate 'bolt 16' of the drawing reference number descriptions exemplified in FIG. 11 as a keyword, the user may input bolt into the input window and set a highlight color and then press the registration button as exemplified in FIG. 12. Accordingly, the web server may set/register bolt as a keyword, and may output in a predetermined area of the keyword setting interface a keyword indicator that notifies that bolt is set/registered as a keyword. Moreover, the web server may search the bolt in the drawing category, and apply the highlight color to the keyword in the drawing that is currently selected and being enlarged and output. In addition, the web server may output an indicator of the same color as the keyword highlighting color regarding the drawing from which a keyword is searched from among drawings of which previews are available.

As a result, the user may not only easily grasp the keyword in the drawing that is currently being viewed, but may also easily grasp which of the drawings that are not currently being viewed includes the keyword, and thus there is an effect of greatly improving the access efficiency of the information desired by the user. Further, the user may set/register a plurality of keywords, in which case different colors may be set for different keywords, and thus keywords are easily distinguishable by color.

Figure 14:
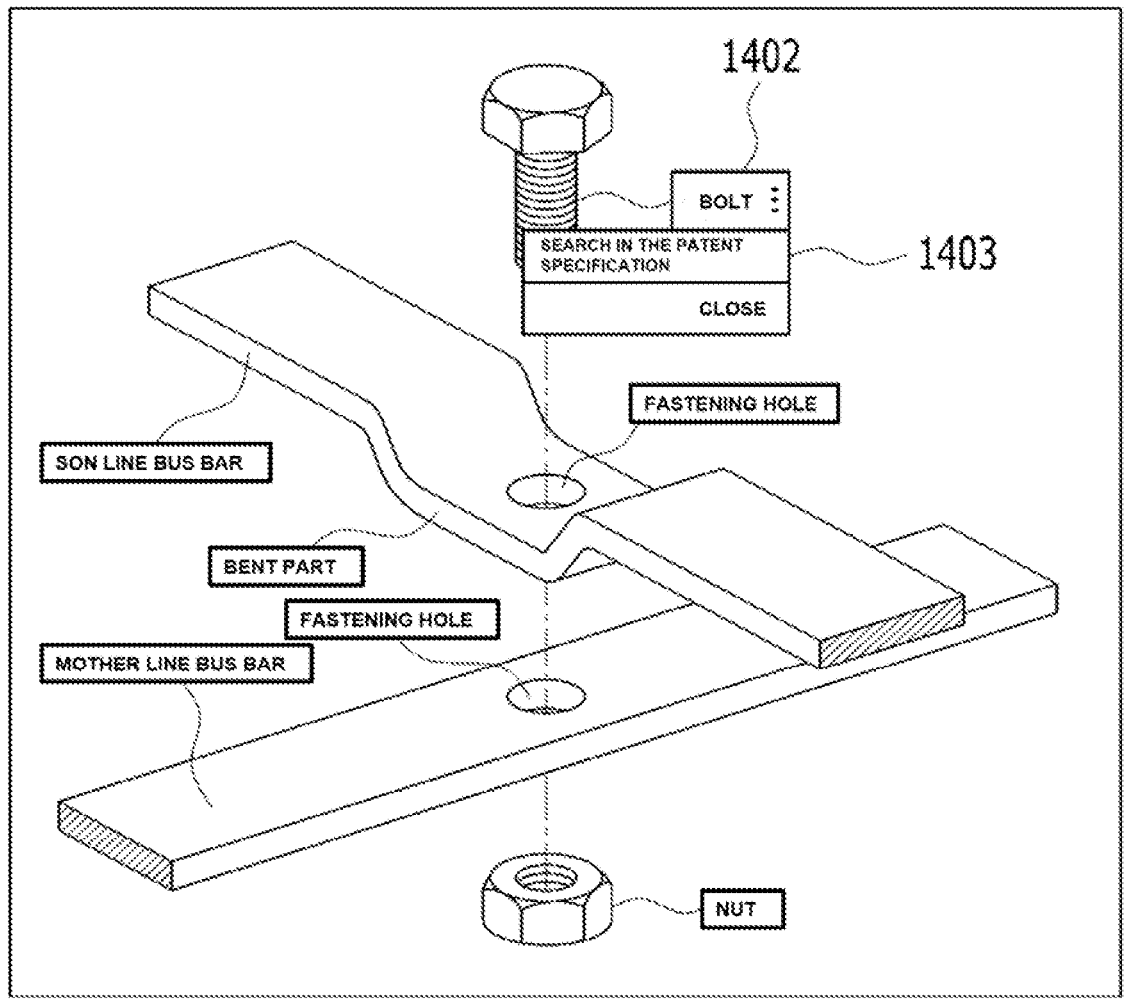
FIG. 14 is a view exemplifying an embodiment of interlock between categories having a drawing reference number description as a medium according to an embodiment of the present disclosure.
Figure 15:
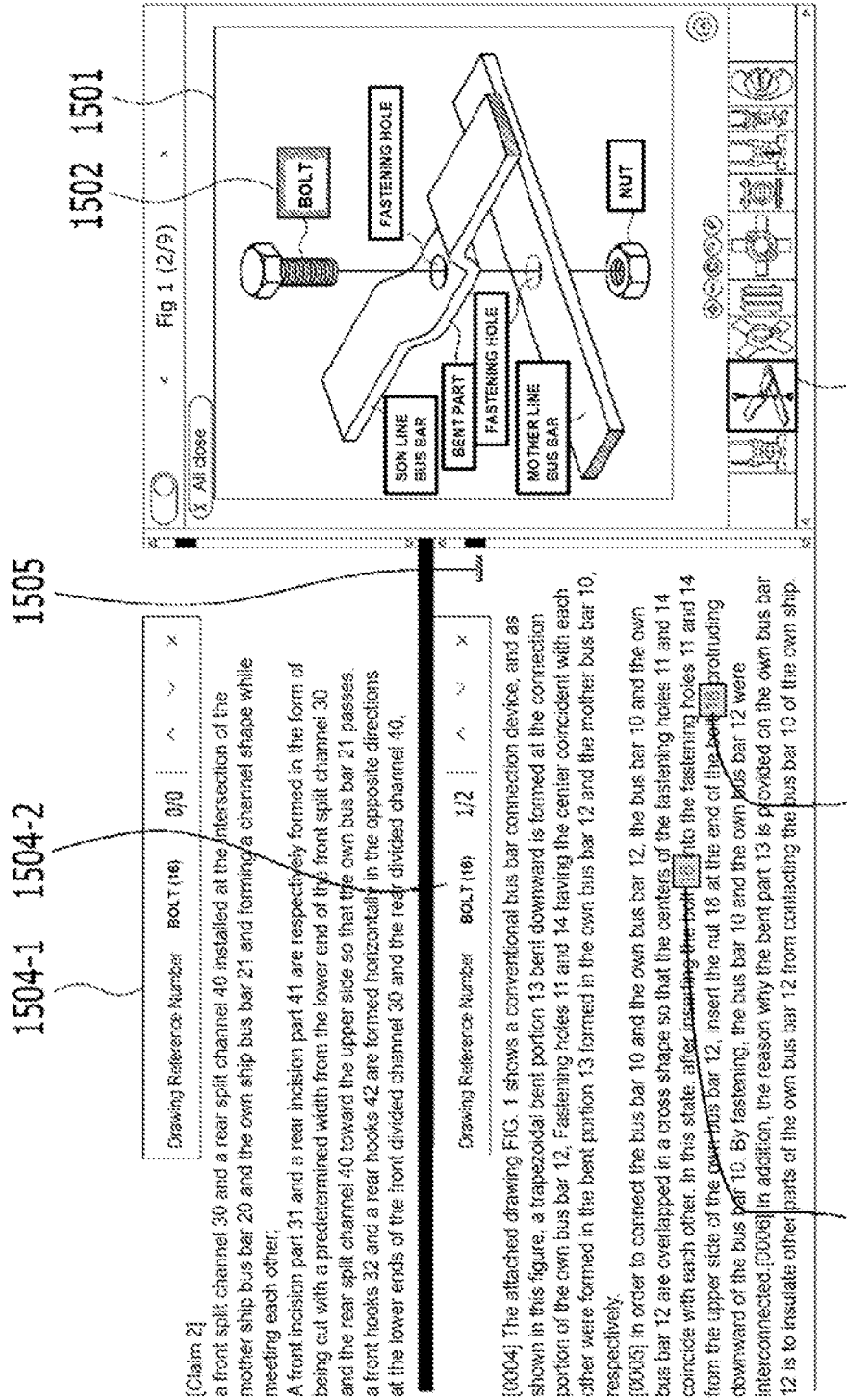
FIG. 15 is a view exemplifying an embodiment of interlock between categories having a drawing reference number description as a medium according to an embodiment of the present disclosure.

FIGS. 14 and 15 are views exemplifying an embodiment of interlock between categories having a drawing reference number description as a medium according to an embodiment of the present disclosure.

As illustrated in FIG. 14, when receiving a user's selection input regarding a drawing reference number description 1402 output to cover a drawing reference number, a selection window for selecting at least one function may be output. Here, the functions being provided 1403 may include a function of exploring/searching the selected drawing reference number description 1402 in the patent specification. When the user selects the present function 1403, the web server may search the selected drawing reference number description 1402 or the drawing reference number corresponding thereto 1402 in all categories, and the web server may apply the highlight display 1502 to the searched drawing reference number description 1402, and output the same as illustrated in FIG. 15.

Referring to FIG. 15, upon searching the selected drawing reference number description or the drawing reference number corresponding thereto in the patent specification category, the web server may apply a predetermined format (for example, underline, bold character display, application of different letter color, highlight display, etc.) regarding all the searched drawing reference number descriptions or drawing reference numbers 1506-1, 1506-2 and highlight the same.

And/or, of the searched drawing reference number descriptions or the drawing reference numbers, the web server may automatically scroll the webpage to the position/page/sentence/paragraph of the drawing reference number description or the drawing reference number 1506-1 located at the top of the patent specification category (especially, the claims set category and the detailed description category).

And/or, of the entire scroll bar area provided in the patent specification category (especially, claims set category and the detailed description category), the web server may output a first indicator 1505 in each of the scroll bar area (or scroll bar neighboring area) corresponding to the position of all the searched drawing reference description or the drawing reference number. That is, by displaying a page area where the drawing reference number description or drawing reference number is positioned in the scroll bar area in a mini map form through the first indicator 1501, the user may move the scroll bar to the position of the first indicator 1505, so as to more easily access the desired information. Moreover, through the first indicator being output in the mini map form, the user may grasp at a glance how much of all the searched drawing reference number descriptions and/or the drawing reference numbers are distributed in which category, and thus may be usefully utilized in determining the importance of the components.

And/or, the web server may provide/output an explore window 1504-1, 1504-2 for exploring the searched drawing reference number description or the drawing reference number in the patent specification category (especially, the claims set category and the detailed description category). Therefore, through the explore window 1504-1, 1504-2, the user may explore right away the paragraph, page, sentence that includes the drawing reference number description or the drawing reference number to be searched.

And/or, the web server may search the selected drawing reference number description or the drawing reference number corresponding thereto in the patent drawing category as well, and provide/output a second indicator 1507 on the drawing, of the drawings of which previews are available, that includes the drawing reference number description of the drawing reference number corresponding thereto. Therefore, the user may select the drawing where the second indicator 1507 is provided/output, thereby exploring/searching the drawing that includes the drawing reference description to be explored.

Meanwhile, although not illustrated in the drawings, the web server may perform an operation of automatically selecting, enlarging and outputting the drawing corresponding to the paragraph/sentence part that the user is currently reading/exploring of the patent specification category. For this purpose, the web server may grasp the contents of the patent specification category (especially, the detailed description category), and divide the area per description regarding each drawing (for example, paragraph, sentence, page), and may automatically select the drawing corresponding to the area being output at the highest ratio currently on the web page, and enlarge and output the same. For example, in a case where the detailed description of FIG. 1 is being output from the user apparatus, the web server may automatically select FIG. 1 and enlarge and output the same in the drawing category.

Similarly, in a case where the user selected a certain area (for example, paragraph, sentence, page) in the patent specification category, the web server may automatically select the drawing corresponding to the selected drawing and enlarge and output the same. Moreover, the web server may perform an operation of automatically replacing the drawing reference number included in the selected certain area with the drawing reference number description.

The web server may make a database of at least one information acquired/recognized through the aforementioned operations/methods/embodiments (that is, accumulate as data and store per database), thereby generating a patent drawing search database.

For example, the web server may make a grouping of patent literature, patent drawing, size of patent drawing, drawing reference number included in patent drawing, drawing reference number description corresponding to each drawing reference number and/or relative position coordinate of drawing reference number, as one data, and may store the same in the database, thereby generating the patent drawing search database.

Therefore, through the patent drawing search database built as aforementioned, the user may input a search word related to the patent literature, thereby easily acquiring information regarding a patent drawing intended to search, from among all patent drawings in the world.

Moreover, the web server may learn various patent drawing data in real time/regularly through the patent drawing search database built as described above, thereby updating the various models/rules described above and improving the recognition accuracy/speed.

Figure 16:
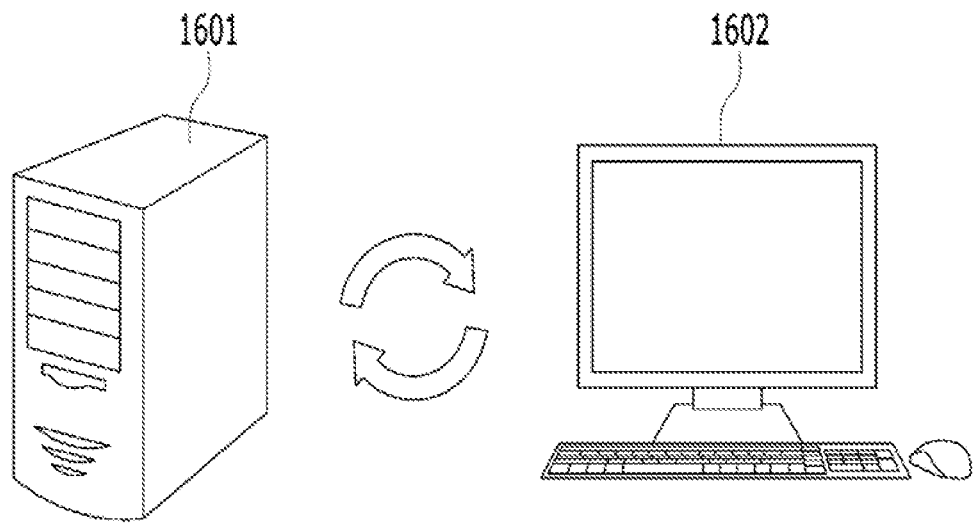
FIG. 16 is a view exemplifying a patent information search system according to an embodiment of the present disclosure.

FIG. 16 is a view exemplifying a patent information search system according to an embodiment of the present disclosure;

Referring to FIG. 16, the patent information search system provided in the present specification may include a web server and a user apparatus.

The web server 1601 and the user apparatus 1602 are mainly interconnected through Internet connection to perform communication, and may provide/receive a patent information search service through a web service/page.

The web server 1601 may correspond to a server/apparatus that includes at least one software and hardware component designed to perform embodiments proposed in the present specification. Especially, the web server 1601 may provide the patent information search service proposed in the present specification to the user apparatus that is a client apparatus.

The user apparatus 1602 may correspond to a client apparatus that receives the patent information search service that is provided through the web server. The user apparatus 1602 may receive the patent information search service that the web server provides through the internet web page.

In the present specification, the case where the patent information search system consists of the web server 1601 and the user apparatus 1602 was exemplified, but there is no limitation thereto, and according to embodiments, the web server 1601 may be replaced by and described as an application server, program server, or service providing apparatus. In addition, in the present specification, the subject of performing the embodiment was described as being the web server 1601 but there is no limitation thereto, and thus the web server 1601 may be replaced with a program or application designed to embody the aforementioned embodiments, and operations of the web server 1601 may be interpreted as being functions of the program or application designed to embody the aforementioned embodiments.

Figure 17:
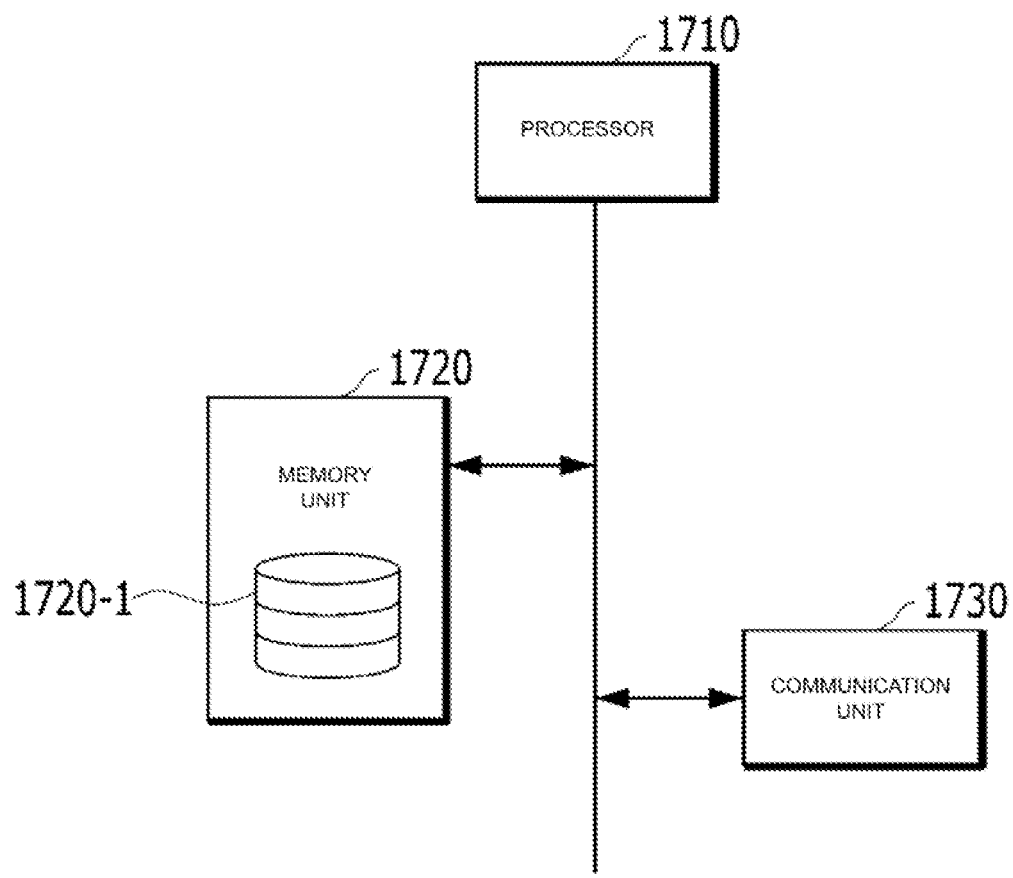
FIG. 17 is a block diagram of a web server according to an embodiment of the present disclosure.

FIG. 17 is a block diagram of a web server according to an embodiment of the present disclosure.

Referring to FIG. 17, the web server may include a processor 1710, a memory unit 1720 and a communication unit 1730.

The processor 1710 may perform communications with other components or control the same in order to perform the embodiments proposed in the present specification, and may execute various programs and/or applications stored in the memory unit 1720 and process internal data. The processor 1710 may be configured to include at least one of a Central Processing Unit (CPU), a Micro Processor Unit (MPU), a Micro Controller Unit (MCU), an Application Processor (AP), an Application Processor (AP), or a processor having an arbitrary form that is well known in the related art of the present disclosure. Therefore, in the present specification, the web server may be replaced by and described as a processor.

The memory unit 1720 not only means digital data storage space that can be embedded, such as a flash memory, a hard disk drive (HDD), a solid state drive (SSD), etc., but is also referred to as external storage space that allows data storage through communication connection such as Cloud. Therefore, the memory unit 1720 may store various digital data such as video, audio, photo, image, text, application, and program. Especially, the memory unit 1720 proposed in the present specification may store various knowledge information contents (especially, patent literature) data, and may store the patent literature search database and/or patent drawing search database 1720-1 built by the processor 1710. Therefore, according to embodiments, the processor 1710 may load various data from the patent literature and/or patent drawing search database stored in the memory unit 1720, and perform data processing/output operation, etc.

The communication unit 1730 may use at least one wired/wireless communication protocol to perform communication, and transmit/receive data.

Embodiments of the present disclosure may be realized by various means, for example, hardware, firmware, software or a combination thereof. In the case of realization by hardware, an embodiment of the present disclosure may be realized by one or more application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, etc.

Further, in the case of realization by firmware or software, an embodiment of the present disclosure may be realized in the form of a module, process, function and the like for performing functions or operations described above, and may be recorded in readable recording media through various computer means. Here, the recording medium may include a program command, data file, data structure, or a combination thereof. The program instructions recorded in the recording medium may be specially designed and configured for the present invention, or may be known and available to those skilled in the art of computer software. For example, the recording medium includes a magnetic medium such as a hard disk, a floppy disk and a magnetic tape, an optical media such as a compact disk read only memory (CD-ROM), and a digital video disk (DVD), a Magneto-Optical Media such as a Floptical Disk, and hardware devices specially configured to store and execute program instructions such as ROM, RAM, Flash memory, etc. Examples of program instructions may include not only machine language codes such as those generated by a compiler, but also high-level language codes that can be executed by a computer using an interpreter or the like. Such hardware devices may be configured to operate as one or more software modules to perform the operations of the present disclosure, and vice versa.

Further, the device or terminal according to the present disclosure may be driven by instructions to cause one or more processors to perform the functions and processes described above. For example, such instructions may include interpreted instructions, such as script instructions, such as JavaScript or ECMAScript instructions, or executable code or other instructions stored on a computer-readable medium. Moreover, the device according to the present disclosure may be implemented in a distributed manner across a network, such as a server farm, or may be implemented in a single computer device.

A computer program (also known as a program, software, software application, script or code) mounted on the apparatus according to the present disclosure and executing the method according to the disclosure may be written in any form of programming language including compiled or interpreted language or a priori or procedural language, and may be deployed in any form, including other units suitable for use in standalone programs, modules, components, subroutines, or computer environments. A computer program does not necessarily correspond to a file of a file system. A program may be stored in a single file provided in a requested program, or in multiple interacting files (e.g., one or more modules, subprograms or files that store portions of codes), or portions of files that hold other programs or data (e.g., one or more scripts stored within a markup language document). A computer program may be deployed to be executed on a single computer or multiple computers located at one site or distributed over a plurality of sites and interconnected by a communication network.

Although each drawing has been described separately for convenience of description, it is also possible to design to implement a new embodiment by merging the embodiments described in each drawing. In addition, the present disclosure is not limited to the configuration and method of the embodiments described as described above, but the above-described embodiments are configured by selectively combining all or part of each embodiment so that various modifications can be made.

In addition, although the preferred embodiments have been illustrated and described above, the present specification is not limited to the specific embodiments described above, and various modifications may be made by those skilled in the art without departing from the gist of the claims, and these modifications should not be individually understood from the technical spirit or perspective of the present specification.

INDUSTRIAL APPLICABILITY

The present disclosure may be utilized in various patent search systems/apparatuses/methods.

What is claimed is:

1. A patent drawing reference number recognition method comprising:
receiving input of a patent drawing that is subject of a drawing reference number recognition;
recognizing a position of a drawing reference number included in the patent drawing using the drawing reference number position recognition model;
cutting out the drawing reference number of the recognized position from the patent drawing in an image piece; and
recognizing the drawing reference number included in the image piece using the drawing reference number recognition model,
wherein the drawing reference number position recognition model is generated based on the following procedure:
recognizing positions of the drawing reference number included in the a plurality of patent drawing samples;
extracting a common feature from the recognized positions of the drawing reference number; and
generating the drawing reference number position recognition model based on the extracted common feature,
wherein drawing reference number recognition model is generated based on the following procedure:

recognizing positions of the drawing reference number included in the plurality of patent drawing samples using the drawing reference number position recognition model;

cutting out the drawing reference numbers of the recognized positions from the plurality of patent drawing samples in the image piece;

recognizing the drawing reference number included in each of the cut out image pieces;

extracting the common feature from the recognized drawing reference number; and generating the drawing reference number recognition model based on the extracted common feature.

2. The patent drawing reference number recognition method according to claim 1, wherein the recognizing the drawing reference number comprises:

gathering the image piece in predetermined number units and generating one image; and recognizing the plurality of drawing reference numbers included in the one image.

3. The patent drawing reference number recognition method according to claim 1, comprising:

searching the recognized drawing reference number in a patent specification corresponding to the patent drawing;

when the recognized drawing reference number is searched in the patent specification, determining the recognized drawing reference number as a final drawing reference number; and when the recognized drawing reference number is not searched in the patent specification, determining a character having a shape similarity that is greater than or equal to a predetermined ratio with the recognized drawing reference number in the patent specification as the final drawing reference number.

4. The patent drawing reference number recognition method according to claim 1, further comprising recognizing a drawing reference number in a patent specification corresponding to the patent drawing;

determining whether there is a drawing reference number matching with the drawing reference number recognized in the patent specification from among the drawing reference numbers recognized through the patent drawing;

when there is a matching drawing reference number, determining the drawing reference number recognized in the patent specification as the final drawing reference number; and when there is no matching drawing reference number, determining the drawing reference number having a shape similarity that is greater than or equal to a predetermined ratio with the drawing reference number recognized in the patent specification, from among the drawing reference numbers recognized through the patent drawing.

5. A patent drawing reference number recognition method, comprising:

extracting a drawing reference number description corresponding to the recognized drawing reference number in a patent specification corresponding to the patent drawing;

recognizing a size of the patent drawing and the position of the drawing reference number included in the patent drawing, and acquiring a relative position coordinate of the drawing reference number in the patent drawing;

generating an image of a same size as the patent drawing;

overlapping the image on the patent drawing and then fixing it on the patent drawing;

assigning a relative position coordinate of a position corresponding to the acquired relative position coordinate to the drawing reference number description;

displaying the drawing reference number description on the relative position coordinate assigned to the drawing reference number description, on the image; and outputting an image where the drawing reference number description is displayed, wherein the extracting the drawing reference number description comprises:

generating a drawing reference number description extraction rule using a plurality of patent specification samples based on a text mining technique; and extracting the drawing reference number description from the patent specification based on the generated drawing reference number description extraction rule, wherein the generating the drawing reference number description extraction rule comprises:

classifying the plurality of patent specification samples per country of filing;

extracting a common feature per classified country of filing; and generating the drawing reference number description extraction rule based on the extracted feature.

6. The patent drawing reference number recognition method according to claim 5, wherein the extracting the common feature is a step of extracting the common feature based on at least one of a relative position of the drawing reference number description based on the drawing reference number, a format applied to the drawing reference number description, and a filing year.

7. The patent drawing reference number recognition method according to claim 6, when the drawing reference number description extraction rule is generated based on the relative position of the drawing reference number description based on the drawing reference number, the extracting the drawing reference number description comprises:

searching the recognized drawing reference number in the patent specification;

predicting the relative position of the drawing reference number description based on the searched drawing reference number according to the drawing reference number description extraction rule; and extracting a character of the predicted position as the drawing reference number description.

8. The patent drawing reference number recognition method according to claim 7, further comprising, when a plurality of drawing reference number descriptions are extracted, searching the extracted plurality of drawing reference number descriptions in the patent specification; and determining the drawing reference number description that is searched the most as a final drawing reference number description.

9. The patent drawing reference number recognition method according to claim 5, further comprising modifying the extracted drawing reference number description in order to increase the extraction accuracy of the drawing reference number description.

10. The patent drawing reference number recognition method according to claim 9, further comprising:
searching the extracted drawing reference number description in the patent specification using the plurality of patent specification samples based on the generated drawing reference number description extraction rule;
classifying the drawing reference number description that is not searched in the patent specification as the drawing reference number description where an error occurred;
extracting a common feature from the classified drawing reference number description and generating an error extraction rule; and
determining whether there is an error in the drawing reference number description extracted in the patent specification based on the generated error extraction rule.

11. The patent drawing reference number recognition method according to claim 10, wherein the extracting the common feature is a step of extracting the common feature based on at least one of whether a number of alphabet is extracted as the alphabet or the number, whether a predetermined part of speech is included in the drawing reference number description, and whether a symbol is included in the drawing reference number description.

12. The patent drawing reference number recognition method according to claim 10, when it is determined that the extracted drawing reference number description has an error, the modifying the extracted drawing reference number description comprises deleting the error or replacing the error with another character in the extracted drawing reference number description.

13. The patent drawing reference number recognition method according to claim 10, further comprising learning the generated drawing reference number description extraction rule and the generated error extraction rule and generating a drawing reference number description extraction model.

14. The patent drawing reference number recognition method according to claim 5, further comprising generating a patent drawing search database by mutually matching the recognized drawing reference number and the recognized drawing reference number description and storing in a database.

15. A patent drawing reference number recognition and drawing reference number description output method, comprising:
receiving input of a patent drawing;
recognizing a position of a drawing reference number included in the patent drawing;
recognizing the drawing reference number of the recognized position of the drawing reference number;
acquiring a relative position coordinate of the drawing reference number in the patent drawing;
generating an image of a same size as the patent drawing;
overlapping the image on the patent drawing and then fixing it on the patent drawing;
extracting a drawing reference number description corresponding to the recognized drawing reference number in a patent specification corresponding to the patent drawing;
assigning a coordinate of a position corresponding to the acquired relative position coordinate to the drawing reference number description corresponding to the drawing reference number as a relative position coordinate regarding the image;
displaying the drawing reference number description on the relative position coordinate assigned to the drawing reference number description, on the image; and
outputting an image where the drawing reference number description is displayed,
wherein the extracting the drawing reference number description comprises:
generating a drawing reference number description extraction rule using a plurality of patent specification samples based on a text mining technique; and
extracting the drawing reference number description from the patent specification based on the generated drawing reference number description extraction rule,
wherein the generating the drawing reference number description extraction rule comprises:
classifying the plurality of patent specification samples per country of filing;
extracting a common feature per classified country of filing; and
generating the drawing reference number description extraction rule based on the extracted feature.

* * * * *